(12) United States Patent
Yokota et al.

(10) Patent No.: US 7,219,232 B2
(45) Date of Patent: May 15, 2007

(54) METHOD OF PROVIDING INFORMATION VIA A COMMUNICATION NETWORK AND INFORMATION PROVIDING SYSTEM

(75) Inventors: Kaoru Yokota, Ashiya (JP); Motoji Ohmori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 752 days.

(21) Appl. No.: 10/403,042

(22) Filed: Apr. 1, 2003

(65) Prior Publication Data

US 2003/0191968 A1    Oct. 9, 2003

(30) Foreign Application Priority Data

Apr. 3, 2002    (JP)    ............................. 2002-101076

(51) Int. Cl.
*H04L 29/08*    (2006.01)
*H04L 29/02*    (2006.01)
*H04L 29/12*    (2006.01)

(52) U.S. Cl. ..................... 713/170; 713/168; 713/161
(58) Field of Classification Search ................ 713/170, 713/168, 161
See application file for complete search history.

(56) References Cited

U.S. PATENT DOCUMENTS

| | | | |
|---|---|---|---|
| 5,343,529 A * | 8/1994 | Goldfine et al. | ............... 705/75 |
| 5,666,420 A | 9/1997 | Micali | |
| 6,028,937 A * | 2/2000 | Tatebayashi et al. | ........ 713/169 |
| 6,049,611 A * | 4/2000 | Tatebayashi et al. | .......... 380/44 |
| 6,477,645 B1 * | 11/2002 | Drews | ......................... 713/168 |
| 2005/0144484 A1 * | 6/2005 | Wakayama | ................. 713/202 |

FOREIGN PATENT DOCUMENTS

WO    99/48243    9/1999

OTHER PUBLICATIONS

N. Asokan, V. Shoup, M. Waidner, 1998 IEEE Security and Privacy Symposium, entitled "*Asynchronous Protocols for Optimistic Fair Exchange*".
Asokan N., et al., entitled "*Optimistic Protocols for Fair Exchange*", IBM Research Report, San Jose, CA, US, Feb. 9, 1996, pp. 1-23, XP002208883.
Asokan N., et al., entitled "*Asynchronous Protocols for Optimistic Fair Exchange*", Security and Privacy, 1998. Proceedings. 1998 IEEE Symposium on Oakland, CA, USA, May 3-6, 1998, Los Alamitos, CA, USA, IEEE Comput. Soc, US, May 3, 1998, pp. 86-99, XP010280363.

* cited by examiner

*Primary Examiner*—Gilberto Barron
*Assistant Examiner*—Venkat Perungavoor
(74) *Attorney, Agent, or Firm*—Wenderoth, Lind & Ponack, L.L.P.

(57) ABSTRACT

An information providing system for highly secure transactions includes an information providing apparatus that provides content data and provided information describing data, which describes the content of the content data, and an information receiving apparatus that is connected to the information providing apparatus via a communication network, receives the content data and the provided information describing data, and transmits a receipt for the received content data to the information providing apparatus. The information receiving apparatus confirms whether the content data is authentic based on the content data and the provided information describing data, and transmits the receipt to the information providing apparatus only when the content of the content data matches the provided information describing data.

7 Claims, 14 Drawing Sheets

FIG. 7

| $d_0$ | $HASH\_F(i_0)$ |
|---|---|
| YESTERNIGHT | 100110100···· |
| LET IT GO | 00100110···· |
| ⋮ | ⋮ |

METHOD OF PROVIDING INFORMATION VIA A COMMUNICATION NETWORK AND INFORMATION PROVIDING SYSTEM

BACKGROUND OF THE INVENTION (1) Field of the Invention

The present invention relates to a method of providing information and to an information providing system that provide information via a network such as the Internet. In particular, the present invention relates to an information providing apparatus and an information providing system that can perform transactions for information with high security.

(2) Description of the Prior Art

As Internet usage has expanded into ordinary households, transactions, such as Internet auctions, where individual users buy and sell goods via a network have become increasingly common. It has also become common for individual users to develop commercial sites for music contents, images, software, etc., that have been created by the user himself or herself so that such contents can be bought and sold by individual users via the network. When contents are bought and sold, the users involved in the transaction are not able to see or meet the unknown person with whom they are dealing, which can be a source of anxiety for both users. This is to say, the content provider may be anxious about whether the content receiver will definitely pay the suitable amount after receiving the content. On the other hand, the content receiver may be anxious about whether the content will be properly sent after the content receiver has paid.

Prior Art Example

A technique for solving the problem described above has already been proposed. This technique is disclosed in the document [N. Asokan, V. Shoup, M. Waidner, "Asynchronous Protocols for Optimistic Fair Exchange," (1998 IEEE Security and Privacy Symposium), for example.

In this prior art example, the information provider transmits content data iO and a provider certificate, which confirms that this content data iO is from this information provider, to the receiver. In exchange for this content data iO and the provider certificate, the receiver transmits a receipt showing that the content data iO has been properly received to the information provider. When the exchanging of the content data iO and the receipt is not performed successfully between the information provider and the receiver, either of two situations, "the content data iO was provided by the information provider but the receiver cannot receive it" and "the receiver cannot receive the content data iO" is possible. In this case, the information provider or the receiver can provide the data that was exchanged between the information provider and the receiver to a dispute resolution agency and issue a resolution request. The dispute resolution agency then checks the data that is provided and judges whether the issued request is legitimate. On judging that the request is legitimate, the dispute resolution agency resolves the problem by making it possible for the information provider to receive the receipt or by making it possible for the receiver to receive the content data. This prior art is described in detail below.

Exchange Protocol

FIG. 11 shows the composition of the "exchange protocol" that is the protocol used to exchange the content data and the receipt between the information provider and the receiver. The procedure of this exchange protocol is described below in accordance with FIG. 11.

Initial Settings

The information provider and the receiver are assumed to each have generated a pair of a public key and a secret key in accordance with a public key encryption method and to have made their respective public keys available. The dispute resolution agency is also assumed to have generated a public key and secret key pair and to have made its public key available.

(0) Request for the Provision of Information

First, the receiver requests the information provider to provide information. After this request, each party obtains the other party's public key.

(1) Generation of the Data me1

The information provider generates data me1 including the related party data, dispute resolution data, first provider certifying data, and receipt text data that are described below.

Related Party Data

The related party data is data generated by linking a public key VO of the information provider, a public key VR of the receiver, and a public key T of the dispute resolution agency. This is to say, the related party data is generated according to expression (1) below.

$$VO\|VR\|T \quad (1)$$

Here, the operator "$\|$" represents the linking of data.

Dispute Resolution Data

The dispute resolution data is generated by linking the content data iO, second provider certifying data keyO, the public key VO of the information provider, and the public key VR of the receiver and then encrypting the linked data using the public key T of the dispute resolution agency. This is to say, the dispute resolution data is generated according to expression (2) below.

$$EncT(iO\|keyO\|VO\|VR) \quad (2)$$

Here, the term "EncT(X)" represents the result of encryption of the input data X using the public key T. The second provider certifying data keyO is data that is generated at random by the information provider.

First Provider Certifying Data

The information provider generates the first provider certifying data hO from the second provider certifying data keyO mentioned above in accordance with expression (3) below.

$$hO=HASH\ (keyO) \quad (3)$$

Here, HASH (X) represents the value of a hash function for input data X, which is to say, the hash value for the input data X.

Receipt Text Data

The information provider generates the receipt text data receipt_tex in which a content of the information received by the receiver, the sum paid in exchange for the information, the date and time of receipt, etc., are written.

The information provider uses the information provider's secret key to sign the data generated by linking the four pieces of data mentioned above and thereby generates the data me1. This is to say, the data me1 is generated in accordance with expression (4) below.

$$me1 = \quad (4)$$
$$SigO(VO\|VR\|T\|EncT(iO\|keyO\|VO\|VR)\|hO\|\text{receipt\_tex})$$

Here, SigO(X) represents the result (signed text) generated when the input data X is signed using the secret key of the information provider.

(2) Transmission of the Data me1

The information provider transmits the data me1 generated in process (1) to the receiver.

(3) Checking the Data me1 and Generation of Data me2

Based on the received data me1, the receiver confirms whether the signature of the information provider, the related party data (VO, VR, T), and the receipt text data receipt_tex are correct, and generates the data me2 only when such data are correct. When any of the data above is not correct, the receiver cancels the protocol. The data me2 includes consent data me1 generated as shown below, and first receiver data.

Consent Data me1

The consent data me1 is the same as the data me1 sent from the information provider.

First Receipt Data

The receiver randomly generates second receipt data keyR, and generates first receipt data hR according to expression (5) below.

$$hR = \text{HASH}(keyR) \quad (5)$$

The hash function HASH(X) shown in expression (5) is the same as the hash function HASH(X) shown in expression (3).

In accordance with expression (6) below, the receiver links the consent data me1 and the first receipt data hR and signs the resulting data using the secret key of the receiver, thereby generating the data me2.

$$me2 = SigR(me1\|hR) \quad (6)$$

Here, the term "SigR(X)" represents the signing of input data X using the secret key of the receiver.

(4) Transmission of the Data me2

The receiver transmits the data me2 generated in process (3) to the information provider.

(5) Cancellation Protocol when the Data me2 Does Not Arrive

When the data me2 that should have been transmitted from the receiver has not been received within a predetermined period, or when a retransmission request has been outputted for the data me2 in process (6) described below and the retransmission of the data me2 from the receiver has not been performed within a predetermined period, the information provider cancels the subsequent processing and executes the "cancellation protocol" described below. When the information provider receives the data me2 within the predetermined period, the process (6) below is executed.

(6) Checking of the Data me2 and Generation of Data me3

The information provider confirms whether the signature of the receiver and the consent data me1 are correct for the received data me2 and generates the data me3 only when such data are correct. When any of such data is not correct, the information provider requests the retransmission of the data me2 and the control returns to process (5). The data me3 includes the content data iO shown below and the second provider certifying data keyO.

Content Data iO

The content data iO is the content data that the information provider has promised to provide to the receiver.

Second Provider Certifying Data

The second provider certifying data keyO is the same as the second provider certifying data keyO generated in process (1).

The data generated by linking the above data is set as the data me3. This is to say, the data me3 satisfies the relationship shown in the expression (7) below.

$$me3 = iO\|keyO \quad (7)$$

(7) Transmission of the Data me3

The information provider transmits the data me3 generated in process (6) to the receiver.

(8) Execution of the Receiver Dispute Resolution Protocol when the Data me3 Does Not Arrive When the data me3 that should have been transmitted from the information provider has not been received within a predetermined period, or when a retransmission request has been outputted for the data me3 in process (9) described below and the retransmission of the data me3 from the information provider has not been performed within a predetermined period, the receiver cancels the subsequent processing and executes the "receiver dispute resolution protocol" described below. When the information provider receives the data me3 within the predetermined period, the process (9) below is executed.

(9) Checking of the Data me3 and Generation of Data me4

The receiver confirms whether the content data iO and the second provider certifying data keyO in the received data me3 are authentic. The authenticity of the second provider certifying data keyO is checked by confirming whether the relationship shown in expression (8) below is established with the first provider certifying data hO included in the data me1 received in process (3).

$$hO = \text{HASH}(keyO) \quad (8)$$

The receiver performs the above confirmation and generates the data me4 only when the data me3 is judged to be authentic. When the data me3 is not judged to be authentic, the receiver requests the information provider to retransmit the data me3, and the control returns to process (8). The data me4 is the second receiver data keyR that was generated in process (3) as shown in expression (9) below.

$$me4 = keyR \quad (9)$$

(10) Transmission of the Data me4

The receiver transmits the data me4 generated in process (9) to the information provider.

(11) Execution of the Provider Dispute Resolution Protocol when the Data me4 does not Arrive When the data me4 that should have been transmitted from the receiver has not been received within a predetermined period, or when a retransmission request has been outputted for the data me4 in process (12) described below and the retransmission of the data me4 from the receiver has not been performed within a predetermined period, the information provider cancels the subsequent processing and executes the "provider dispute resolution protocol"

described below. On receiving the data me4 within the predetermined period, the information provider executes the process (12) below.

(12) Checking of the Data me4

Based on the received data me4, the information provider confirms whether the second receiver data keyR is authentic. The authenticity of the second receiver data keyR is checked by confirming that the relationship shown in expression (10) below is established with the first receiver data hR included in the data me2 received in process (5).

$$hR=\text{HASH (key}R) \quad (10)$$

When the above relationship is established, the exchange protocol ends successfully. At this point, the receipt received by the information provider is the data me2 and the data me4. A third party who is neither the information provider nor the receiver and is impartially positioned between them confirms the signature of the data me2 and then confirms whether the relationship shown by expression (11) below is satisfied for the first receipt data hR included in the data me2 and the second receipt data keyR included in the data me4.

$$hR=\text{HASH (key}R) \quad (11)$$

The third party also checks the content of the receipt based on the receipt text data receipt_tex included in the agreement data me1 included in the data me1 obtained from the data me2.

On the other hand, the receiver receives the content data iO.

Cancellation Protocol

The cancellation protocol is executed by the information provider when the data me2 that should have been transmitted from the receiver has not arrived in process (5) in the exchange protocol. FIG. 12 shows the procedure of the cancellation protocol. The following describes the procedure of the cancellation protocol using FIG. 12.

(1) Transmission of Data ma1

The information provider generates the data ma1 by signing data produced by linking the data "cancel" with the data me1 using a secret key of the information provider, and transmits the data ma1 to the dispute resolution agency.

$$ma1=\text{Sig}O(\text{"cancel"}\|me1) \quad (12)$$

Here, the data "cancel" by which the information provider data requests the dispute resolution agency to cancel the exchange protocol. The data me1 is transmitted by the information provider to the receiver in process (2) of the exchange protocol.

(2) Searching the Dispute Resolution List

After verifying the signature of the information provider applied to the transmitted data ma1, the dispute resolution agency then checks whether the data me1 included in the data ma1 is registered in the dispute resolution list, and depending on the result of this checking, executes either of the processes (A) and (B) that are described below. The dispute resolution list is a list showing whether a dispute has been resolved due to the provider dispute resolution protocol being requested by the information provider or the receiver dispute resolution protocol being requested by the receiver.

(A) When the Data me1 is not Registered in the Dispute Resolution List

The dispute resolution agency judges that dispute resolution has not been performed for the transaction for which the cancellation request was issued. The dispute resolution agency adds the received data me1 to the cancellation list. In addition, in accordance with expression (13) below, the dispute resolution agency generates data ma2 by linking "cancelled" data, which certifies that the transaction has been cancelled, with the data ma1, which was sent from the information provider in process (1), and signing the data produced as a result with the secret key of the dispute resolution agency. The dispute resolution agency then transmits the data ma2 to the information provider. The cancellation list is a list showing whether a transaction has been cancelled due to the information provider requesting the cancellation protocol.

$$ma2=\text{Sig}T(\text{"cancelled"}\|ma1) \quad (13)$$

Through this process, the information provider can obtain a certificate showing that the transaction identified by the data me1 included in the data ma1 has been cancelled.

(B) When the Data me1 is Registered in the Dispute Resolution List

The dispute resolution agency judges that the dispute resolution has already been performed for the transaction for which the cancellation request was issued, and sends "dispute resolved" data, which shows dispute resolution has already been performed for this transaction, to the information provider as the data ma2.

Provider Dispute Resolution Protocol

The provider dispute resolution protocol is executed by the information provider when the data me4 that should have been transmitted from the receiver has not arrived in process (11) in the exchange protocol. FIG. 13 shows the procedure of the provider dispute resolution protocol. The following describes the procedure of the provider dispute resolution protocol using FIG. 13.

(1) Transmission of Data mr1

The information provider generates data by linking the content data iO that was transmitted in process (7) of the exchange protocol and the second provider certifying data keyO to the transaction certifying data described below, and transmits this data to the dispute resolution agency as the data mr1. The transaction certifying data is data generated by linking a public key VO of the information provider and the data me1 and data me2 that were respectively handled by processes (2) and (4) of the exchange protocol. This is to say, the data mr1 is generated according to expression (14) below.

$$mr1=VO\|me1\|me2\|iO\|keyO \quad (14)$$

(2) Searching the Cancellation List

The dispute resolution agency checks whether the data me1 included in the transmitted data mr1 is registered in the cancellation list, and depending on the checking result, executes either of the processes (A) and (B) that are described below.

(A) When the Data me1 is Registered in the Cancellation List

The dispute resolution agency judges that the transaction for which a dispute resolution request has been issued has been cancelled and transmits "cancelled" data showing that the transaction has already been cancelled to the information provider as data mr2.

(B) When the Data me1 is not Registered in the Cancellation List

The dispute resolution agency judges that the transaction for which a dispute resolution request has been issued has not been cancelled. Also, the dispute resolution agency adds the data me1 included in the data mr1 to the dispute resolution list. In addition, the dispute resolution agency generates receipt certifying data mr2 in accordance with expression (15) below by linking "reception certified" data showing a certifying of reception by the dispute resolution agency and the data mr1 transmitted from the information provider in process (1) and signing the linked data with the secret key of the dispute resolution agency, and transmits this data mr2 to the information provider.

$$mr2=Sig_T(\text{"reception certified"}\|mr1) \quad (15)$$

Due to this process, the transaction identified by the data me1 included in the data mr1 is performed and the information provider can obtain a certificate showing that the content data iO was received by the receiver.

Receiver Dispute Resolution Protocol

The receiver dispute resolution protocol is executed by the receiver when the data me3 that should have been transmitted from the information provider has not arrived in process (8) in the exchange protocol. FIG. 14 shows the procedure of the receiver dispute resolution protocol. The following describes the procedure of the receiver dispute resolution protocol using FIG. 14.

(1) Transmission of Data mr1

The information provider generates data mr1 by linking transaction certifying data described below to the second receipt data keyR that was generated in process (3) of the exchange protocol, and transmits the data mr1 to the dispute resolution agency. The transaction certifying data is data produced by linking a public key VR of the receiver and the data me1 and data me2 that were respectively handled by processes (2) and (4) of the exchange protocol. This is to say, the data mr1 is generated according to expression (16) below.

$$mr1=VR\|me1\|me2\|keyR \quad (16)$$

(2) Searching the Cancellation List

The dispute resolution agency checks whether the data me1 included in the transmitted data mr1 is registered in the cancellation list, and depending on the checking result, executes either of the processes (A) and (B) that are described below.

(A) When the Data me1 is Registered in the Cancellation List

The dispute resolution agency judges that the transaction for which a dispute resolution request has been issued has already been cancelled and transmits "cancelled" data showing that the transaction has already been cancelled to the information provider as data mr2.

(B) When the Data me1 is not Registered in the Cancellation List

The dispute resolution agency judges that the transaction for which a dispute resolution request has been issued has not been cancelled. The dispute resolution agency also extracts dispute resolution data EncT (iO∥keyO∥VO∥VR) from the data me1 included in the data mr1, decrypts this using the secret key of the dispute resolution agency, and obtains the decrypted data iO∥keyO∥VO∥VR. In addition, the dispute resolution agency checks whether the public key VO of the information provider and the public key VR of the receiver that are included in the decrypted data respectively match the public key VO of the information provider and the public key VR of the receiver that were included in the related party data extracted from the data me1. When any of the keys out of these two types of public key do not match, the dispute resolution agency cancels the subsequent processing and does not perform dispute resolution. When both types of key match, the dispute resolution agency transmits the data mr2, which is generated by linking the content data iO included in the decrypted data and the second provider certifying data keyO as shown in expression (17) below, to the receiver.

$$mr2=iO\|keyO \quad (17)$$

In this way, the receiver can receive the content data iO, so that the dispute is resolved.

As described above, in this prior art example, even if a problem occurs during a transaction, the dispute resolution agency executes processing that has the transaction completed successively. This means that both the information provider and the receiver can exchange the content data and the receipt without either party feeling that the exchange has been unfair.

This is to say, when the information provider has transmitted the data me1 to the receiver but cannot receive the data me2 included in the first receipt data hR from the receiver, the information provider executes the cancellation protocol. By doing so, the information provider requests the dispute resolution agency to cancel the transaction and so can have the transaction cancelled.

Also, when the information provider has transmitted the content data iO to the receiver but cannot receive the second receipt data keyR, the information provider executes the provider dispute resolution protocol. By doing so, the information provider can receive the receipt certifying data mr2 from the dispute resolution agency in place of the second receipt data keyR. By using this receipt certifying data mr2, the information provider can prove to a third party that the receiver has received the content data iO.

In addition, when the receiver has transmitted the data me2 including the first receipt data hR to the information provider but cannot receive the content data iO, the receiver executes the receiver dispute resolution protocol. By doing so, the receiver can receive the content data iO from the dispute resolution agency.

However, in this prior art example, there is the problem that the information provider is capable of the illegal act described below.

The following describes an illegal act by the information provider during the exchange protocol shown in FIG. 11.

The information provider generates the dispute resolution data EncT (iO∥keyO∥VO∥VR) using the content data iO in process (1) of the exchange protocol. When doing so, the information provider uses fake data as the content data iO. The receiver receives the data me1 including the dispute resolution data EncT (iO∥keyO∥VO∥VR) in process (2) of the exchange protocol. However, the dispute resolution data EncT (iO∥keyO∥VO∥VR) is encrypted using the public key of the dispute resolution agency, so that at this point, the receiver cannot verify the content of the content data iO. This means that the receiver transmits the data me2 to the information provider in process (4) of the exchange protocol.

After receiving the data me2 in process (4) of the exchange protocol, the information provider does not transmit the content data iO to the receiver, but instead executes the provider dispute resolution protocol.

At this point, in process (1) of the provider dispute resolution protocol shown in FIG. 13, the content data iO included in the data mr1 that the information provider transmits to the dispute resolution agency is the same as the fake data that the information provider used in process (1) of the exchange protocol to generate the dispute resolution data. Since the information provider does not execute the cancellation protocol, the data me1 is not registered in the cancellation list and the transaction is recognized as not having been cancelled. This means that process (B) of the provider dispute resolution protocol is executed and the information provider can illegally obtain the receipt certifying data mr2 from the dispute resolution agency.

On the other hand, a receiver who cannot receive the data me3 executes the receiver dispute resolution protocol, but since the content data iO in the dispute resolution data included in the data me1 is fake, the expected content data is not obtained. As described above, the content data iO is not checked by the dispute resolution agency, so that there is the problem that illegal acts can be performed by the information provider.

At this point, the information provider actually obtains a receipt for the "fake content data". However, when the information provider bills the receiver based on this receipt, the payment agency merely checks the sum written on the receipt, so that there is no checking of what has been purchased by this sum and of whether the purchased item is genuine. Accordingly, the information provider can illegally collect a payment from the receiver using fake content data. This prior art example was originally conceived as for adaptation in a "recorded delivery"-type service, and in the case of recorded delivery, even if a received content is fake, the receiver only issues a receipt for the fake item, so there is no significant problem. However, when a billing process is performed based on the receipt, the billing should be performed with the content data to which the receipt applies first having been checked for authenticity. However, the billing agency does not go as far as checking whether the content data to which the receipt applies is authentic. This makes it possible for the illegal act described above to succeed.

SUMMARY OF THE INVENTION

In view of the condition described above, it is an object of the present invention to provide an information providing method and an information providing system where transactions are highly secure.

It is a further object of the present invention to provide an information providing method and an information providing system where transactions can be performed fairly.

In order to achieve the stated objects, an information providing method according to the present invention is an information providing method for an information providing system including an information providing apparatus that provides content data and an information receiving apparatus that is connected to the information providing apparatus via a communication network and receives the content data, the information providing method comprising: a transmitting step in which the information providing apparatus transmits the content data and provided information describing data, which describes a content of the content data, to the information receiving apparatus; a receiving step in which the information receiving apparatus receives the content data and the provided information describing data from the information providing apparatus; an authenticity confirming step in which the information receiving apparatus confirms whether the content data is authentic, based on the content data and the provided information describing data; a receipt transmitting step in which the information receiving apparatus transmits a receipt for the content data to the information providing apparatus only when the content data is authentic; and a receipt receiving step in which the information providing apparatus receives the receipt from the information receiving apparatus.

That is, the information providing apparatus transmits provided information describing data, which describes the content of the content data, together with the content data. This means that the information receiving apparatus can judge whether the content of the content data is correct based on the content data and the provided information describing data, so that the information receiving apparatus can avoid transmitting a receipt in a case where fake content data has been received. Consequently, the security of transactions for content data can be increased.

An information providing method according to another aspect of the present invention is an information providing method for an information providing system including an information providing apparatus that provides content data and an information receiving apparatus that is connected to the information providing apparatus via a communication network and receives the content data, the information providing method comprising: a describing data transmitting step in which the information providing apparatus transmits provided information describing data, which describes a content of the content data, to the information receiving apparatus; a describing data receiving step in which the information receiving apparatus receives the provided information describing data from the information providing apparatus; a first receipt data transmitting step in which the information receiving apparatus transmits the first receipt data to the information providing apparatus in response to reception of the provided information describing data; a first receipt data receiving step in which the information providing apparatus receives the first receipt data from the information receiving apparatus; a content data transmitting step in which the information providing apparatus transmits the content data to the information receiving apparatus in response to reception of the first receipt data; a content data receiving step in which the information receiving apparatus receives the content data from the information providing apparatus; an authenticity confirming step in which the information receiving apparatus confirms whether the content data is authentic based on the content data and the provided information describing data; a second receipt data transmitting step in which the information receiving apparatus transmits second receipt data to the information providing apparatus only when the content data is authentic; and a second receipt data receiving step in which the information providing apparatus receives the second receipt data from the information receiving apparatus, wherein by collecting both the first receipt data and the second receipt data, the information providing apparatus can prove that the information receiving apparatus received the content data.

That is, the information providing apparatus transmits provided information describing data describing the content of the content data together with the content data. This means that the information receiving apparatus can judge whether the content of the content data is correct based on the content data and the provided information describing data, so that the information receiving apparatus can avoid transmitting the second receipt data in a case where fake content data has been received. Even if the information providing apparatus has received the first receipt data, so long as the second receipt data cannot be received, the information providing apparatus cannot prove that the information receiving apparatus has received the content data. Consequently, the security of transactions for content data can be increased.

In this information providing method, the information providing system further includes a dispute resolution apparatus that is connected to both the information providing apparatus and the information receiving apparatus via the communication network and resolves disputes that arise between the information providing apparatus and the information receiving apparatus, the dispute resolution apparatus having a dispute resolution list, which stores information relating to whether or not a dispute that has arisen between the information providing apparatus and the information receiving apparatus has been resolved, and a cancellation list, which stores information relating to whether an exchanging of data between the information providing apparatus and the information receiving apparatus has been cancelled. In the describing data transmitting step, the information providing apparatus transmits dispute resolution content data, which only the dispute resolution apparatus is capable of decoding, together with the provided information describing data to the information receiving apparatus, and in the describing data receiving step, the information receiving apparatus receives the dispute resolution content data together with the provided information describing data from the information providing apparatus. And the content data receiving step includes: a standby substep in which the information receiving apparatus stands by for a predetermined period until the content data is received; a dispute resolution requesting substep where when the content data could not be received within the predetermined period, the information receiving apparatus transmits the dispute resolution content data and the provided information describing data to the dispute resolution apparatus and requests the dispute resolution apparatus to resolve a dispute; a searching substep in which the dispute resolution apparatus that has been requested to resolve the dispute searches the cancellation list and the dispute resolution list; an authenticity confirming substep where, when an exchanging of data between the information providing apparatus and the information receiving apparatus has not been cancelled and the dispute that has arisen between the information providing apparatus and the information receiving apparatus has not been resolved, the dispute resolution apparatus confirms whether the dispute resolution content data is authentic, based on the dispute resolution content data and the provided information describing data; and a forcible termination substep where when the dispute resolution content data is not authentic, the dispute resolution apparatus forcibly terminates the exchanging of data between the information providing apparatus and the information receiving apparatus.

That is, when transmitting the provided information describing data, the information providing apparatus also transmits dispute resolution content data that only the dispute resolution apparatus is capable of decoding to the information receiving apparatus. When the information receiving apparatus cannot receive the content data even though the first receipt data has been transmitted to the information providing apparatus, the information receiving apparatus transmits the dispute resolution content data and the provided information describing data to the dispute resolution apparatus. Based on the received data, the dispute resolution apparatus confirms whether the dispute resolution content data is authentic, and has the exchanging of data between the information providing apparatus and the information receiving apparatus forcibly terminated when the dispute resolution content data is fake. By doing so the subsequent exchanging of data is cancelled, and the information receiving apparatus does not transmit the second receipt data to the information providing apparatus, which ensures that the transaction is secure.

For example, in the dispute resolution requesting substep, the information receiving apparatus also transmits the second receipt data to the dispute resolution apparatus. The content data receiving step further includes a registering substep, where after confirming whether the dispute resolution content data is authentic and determining that the dispute resolution content data is authentic, the dispute resolution apparatus registers the second receipt data in the dispute resolution list, and the second receipt data receiving step includes: a standby substep in which the information providing apparatus stands by for a predetermined period until the second receipt data is received; a dispute resolution requesting substep where when the second receipt data could not be received within the predetermined period, the information providing apparatus requests the dispute resolution apparatus to resolve a dispute; a searching substep in which the dispute resolution apparatus that has been requested to resolve the dispute searches the cancellation list and the dispute resolution list; a second receipt data transmitting substep in which when an exchanging of data between the information providing apparatus and the information receiving apparatus has not been cancelled and the dispute that has arisen between the information providing apparatus and the information receiving apparatus has been resolved, the dispute resolution apparatus transmits the second receipt data registered in the dispute resolution list to the information providing apparatus; and a second receipt data receiving substep in which the information providing apparatus receives the second receipt data from the dispute resolution apparatus.

That is, even when the information providing apparatus cannot receive the second receipt data from the information receiving apparatus, if the dispute resolution apparatus has judged that a dispute that has arisen between the information providing apparatus and the information receiving apparatus has been resolved, the dispute resolution apparatus transmits the second receipt data registered in the dispute resolution list to the information providing apparatus. This means that there are no cases where the second receipt data cannot be received in spite of the content data having been provided, which ensures that transactions are fair.

An information receiving apparatus according to yet another aspect of the present invention is an information receiving apparatus for use in an information providing system that includes an information providing apparatus that provides content data and an information receiving apparatus that is connected to the information providing apparatus via a communication network and receives the content data, the information receiving apparatus comprising: a data receiving unit operable to receive the content data and provided information describing data, which describes a content of the content data, from the information providing apparatus; a content confirming unit operable to confirm whether the content data is authentic based on the content data and the provided information describing data; and a receipt transmitting unit operable to transmit a receipt for the content data to the information providing apparatus only when the content data is authentic.

That is, the information providing apparatus transmits provided information describing data, which describes a content of the content data, together with the content data. This means that the information receiving apparatus can judge whether the content of the content data is correct based on the content data and the provided information describing data, and so does not transmit a receipt when fake content data has been received. This makes it possible to increase the security of transactions for content data.

An information receiving apparatus according to yet another aspect of the present invention is an information receiving apparatus for use in a information providing system that includes an information providing apparatus that provides content data and an information receiving apparatus that is connected to the information providing apparatus via a communication network and receives the content data, the information receiving apparatus comprising: a data receiving unit operable to receive the content data and provided information describing data, which describes a content of the content data, from the information providing apparatus; a content confirming unit operable to confirm whether the content data is authentic based on the content data and the provided information describing data; and a receipt transmitting unit operable to transmit a receipt for the content data to the information providing apparatus only when the content data is authentic.

That is, the information receiving apparatus judges whether the content of the content data is correct based on the content data and the provided information describing data, and does not transmit a receipt when fake content data has been received. This makes it possible to increase the security of transactions for content data.

A dispute resolution apparatus according to yet another aspect of the present invention is a dispute resolution apparatus for use in a system that includes an information providing apparatus that provides content data, an information receiving apparatus that is connected to the information providing apparatus via a communication network, receives the content data, and transmits a receipt for the content data to the information providing apparatus, and a dispute resolution apparatus that is connected to the information providing apparatus and the information receiving apparatus via the communication network and resolves a dispute that arises between the information providing apparatus and the information receiving apparatus, wherein the receipt includes first receipt data and second receipt data, and by collecting the first receipt data and the second receipt data, it is possible to prove that the information receiving apparatus has received the content data. The information providing apparatus includes a provided information describing data transmitting unit operable to transmit provided information describing data, which describes a content of the content data, and dispute resolution content data, which only the dispute resolution apparatus is capable of decoding, to the information receiving apparatus, a content data transmitting unit operable to receive the first receipt data from the information receiving apparatus and to transmit the content data to the information receiving apparatus in response to reception of the first receipt data; and a second receipt data receiving unit operable to receive the second receipt data in response to the content data that has been transmitted. The information receiving apparatus includes a first receipt data issuing unit operable to receive the provided information describing data and the dispute resolution content data from the information providing apparatus, to issue the first receipt data in response to reception of the data, and to transmit the first receipt data to the information providing apparatus, a second receipt data issuing unit operable to receive the content data from the information providing apparatus, to issue the second receipt data in response to reception of the content data, and to transmit the second receipt data to the information providing apparatus, and a receiving apparatus dispute requesting unit operable to transmit, when the content data cannot be received from the information providing apparatus within a predetermined period following transmission of the first receipt data, the provided information describing data and the dispute resolution content data to the dispute resolution apparatus and to request the dispute resolution apparatus to resolve a dispute. And the dispute resolution apparatus comprises: a dispute resolution list storing unit operable to store a dispute resolution list that stores information relating to whether a dispute that has arisen between the information providing apparatus and the information receiving apparatus has been resolved; a cancellation list storing unit operable to store a cancellation list that stores information relating to whether an exchanging of data between the information providing apparatus and the information receiving apparatus has been cancelled; a content confirming unit operable to confirm, when an exchanging of data between the information providing apparatus and the information receiving apparatus has not been cancelled and the dispute that has arisen between the information providing apparatus and the information receiving apparatus has not been resolved, whether the dispute resolution content data is authentic, based on the dispute resolution content data and the provided information describing data received from the information receiving apparatus; and a forcible cancellation executing unit operable to forcibly terminate, when the dispute resolution content data is not authentic, the exchanging of data between the information providing apparatus and the information receiving apparatus.

That is, the dispute resolution apparatus checks the authenticity of the dispute resolution content data based on the dispute resolution content data and the provided information describing data received from the information receiving apparatus, and forcibly terminates the exchanging of data between the information providing apparatus and the information receiving apparatus if the dispute resolution content data is fake. By doing so, subsequent exchanging of data is cancelled and the information receiving apparatus does not transmit the second receipt data to the information providing apparatus, thereby ensuring that the transaction is secure.

An information providing apparatus according to yet another aspect of the present invention is an information providing apparatus for use in a system including an information providing system that provides content data and an information receiving apparatus that is connected to the information providing apparatus via a communication network and receives the content data, the information providing apparatus being characterized by transmitting the content data together with provided information describing data, which describes a content of the content data, to the information receiving apparatus.

That is, the information providing apparatus transmits content data and provided information describing data, which describes the content of the content data, together with the content data. This means that an information receiving apparatus can judge whether the content of the content data is correct based on the content data and the provided information describing data, so that the information receiving apparatus can avoid transmitting a receipt in a case where fake content data has been received. Consequently, the security of transactions for content data can be increased.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 shows an example of content confirming information stored in a content confirmation information storage unit of the confirmation information storage apparatus;

DESCRIPTION OF THE PREFERRED EMBODIMENT

The following describes in detail, with reference to the attached drawings, an embodiment of an information providing system according to the present invention.

Figure 1:
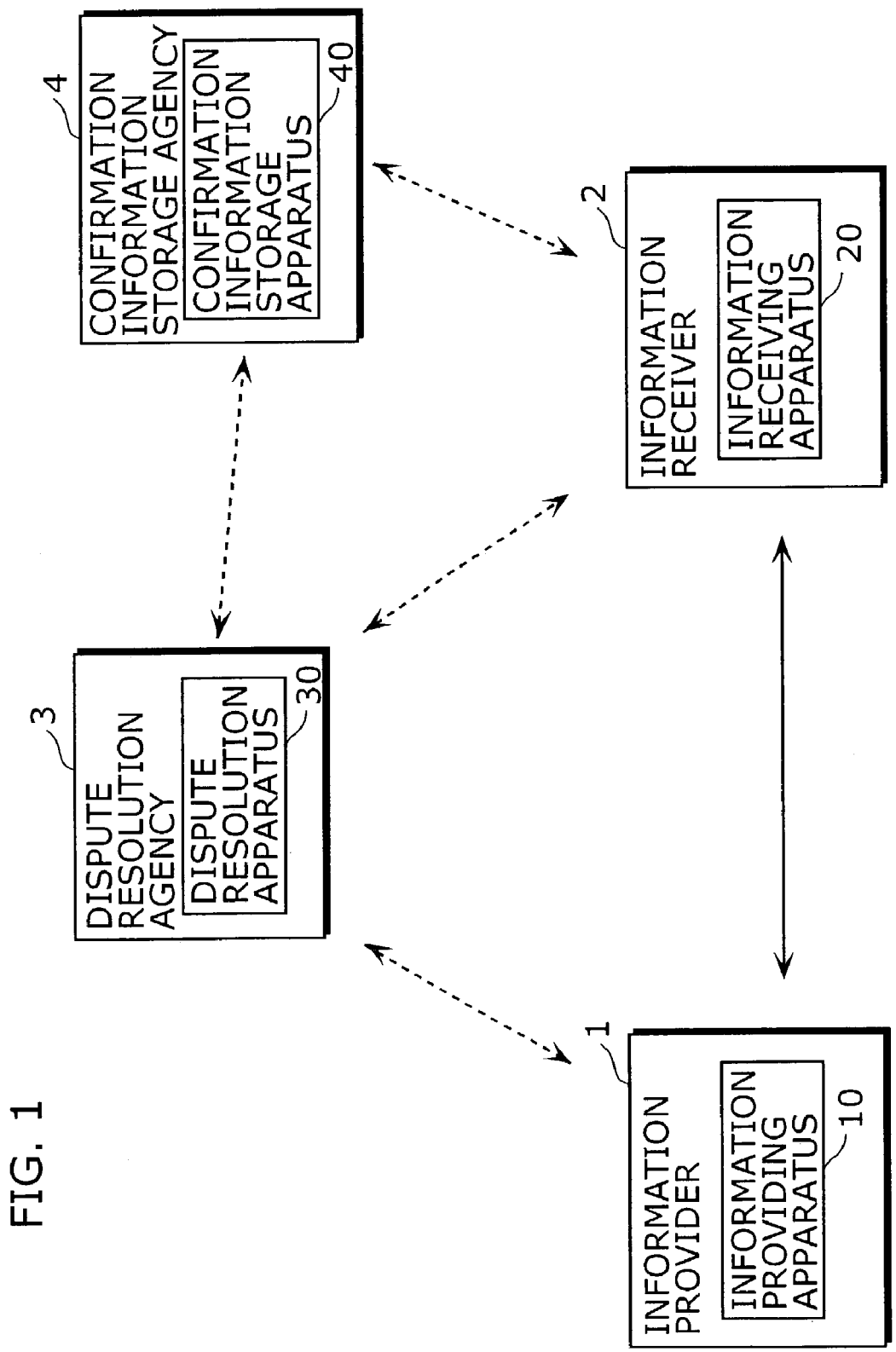
FIG. 1 is a block diagram showing the overall construction of an information providing system according to an embodiment of the present invention.

FIG. 1 shows the overall construction of an information providing system according to an embodiment of the present invention. The information providing system is a system for performing transactions for content data, and includes an information providing apparatus 10 that is used by an information provider 1 who provides content data, an information receiving apparatus 20 that is used by an information receiver 2 who receives the content data and issues a receipt for the content data, a dispute resolution apparatus 30 that is used by a dispute resolution agency 3 who resolves problems that occur when a transaction has not been successfully performed by the information provider 1 and the information receiver 2, and a confirmation information storage apparatus 40 that stores information for confirming whether the content data is genuine or fake.

The information providing apparatus 10, the information receiving apparatus 20, and the dispute resolution apparatus 30 are connected to each other via a network, here represented by the Internet. The confirmation information storage apparatus 40 is also connected via a network to each of the dispute resolution apparatus 30 and the information receiving apparatus 20.

One conceivable example of the specific constructions of the information providing apparatus 10, the information receiving apparatus 20, the dispute resolution apparatus 30, and the confirmation information storage apparatus 40 is computers or server apparatuses, etc., where various processes are realized by programs.

Figure 2:
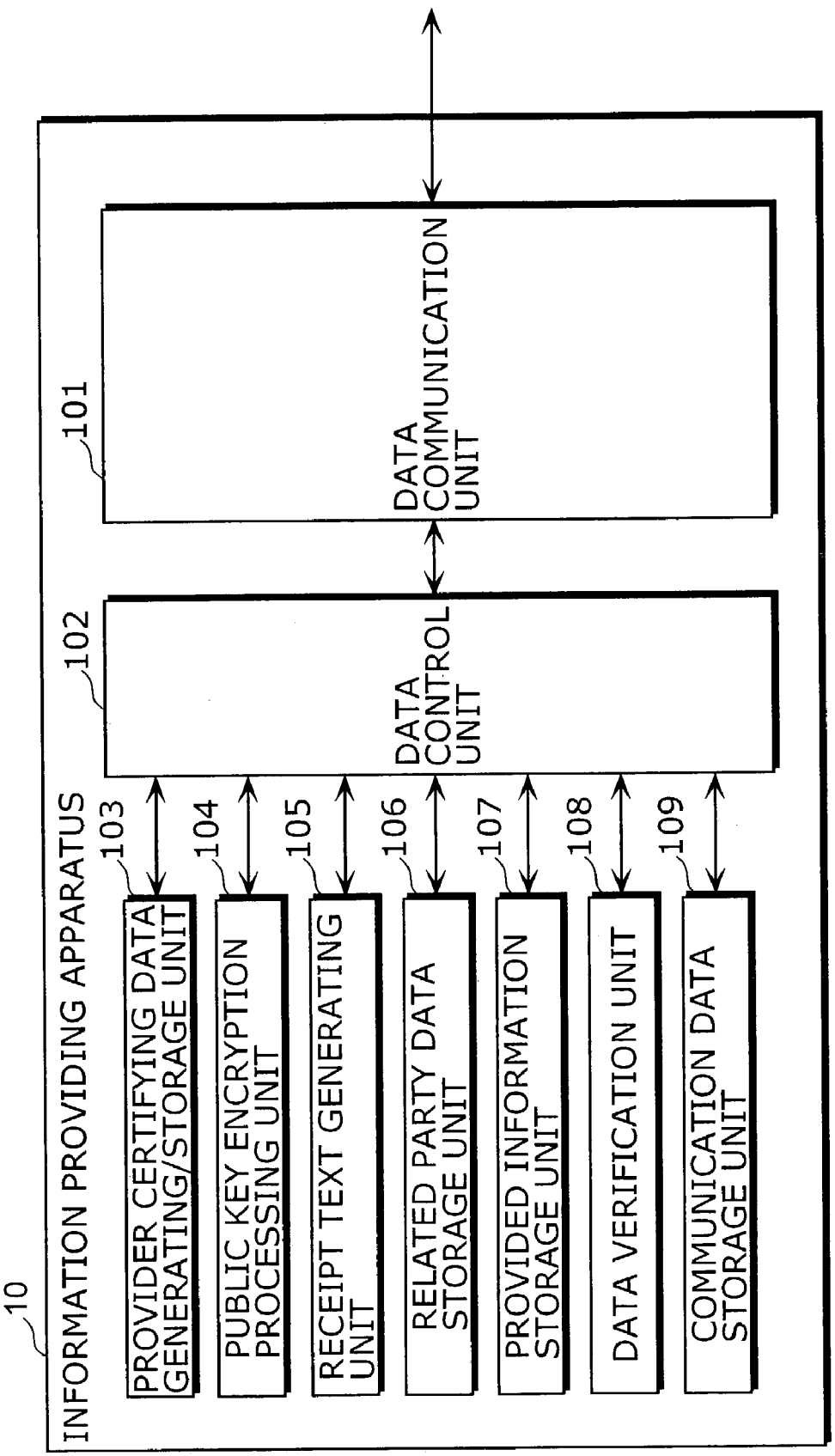
FIG. 2 shows the hardware construction of an information providing apparatus according to the embodiment of the present invention.

FIG. 2 shows the hardware construction of the information providing apparatus 10. The information providing apparatus 10 includes a data communication unit 101, a data control unit 102, a provider certifying data generating/storage unit 103, a public key encryption processing unit 104, a receipt text generating unit 105, a related party data storage unit 106, a provided information storage unit 107, a data verification unit 108, and a communication data storage unit 109.

The data communication unit 101 transmits and receives data to and from the outside. The data control unit 102 controls the inputting and outputting of data to and from the various parts of the information providing apparatus 10. The provider certifying data generating/storage unit 103 generates the provider certifying data and stores this data. The public key encryption processing unit 104 performs processing in accordance with a public key encryption method. The receipt text generating unit 105 generates the text of a receipt. The related party data storage unit 106 stores data relating to the related parties in an exchange procedure. The provided information storage unit 107 stores the content data, etc., to be provided. The data verification unit 108 checks the consistency of the data transmitted from the information receiving apparatus 20. The communication data storage unit 109 stores the data exchanged between the information providing apparatus 10 and the information receiving apparatus 20 or the dispute resolution apparatus 30.

Figure 3:
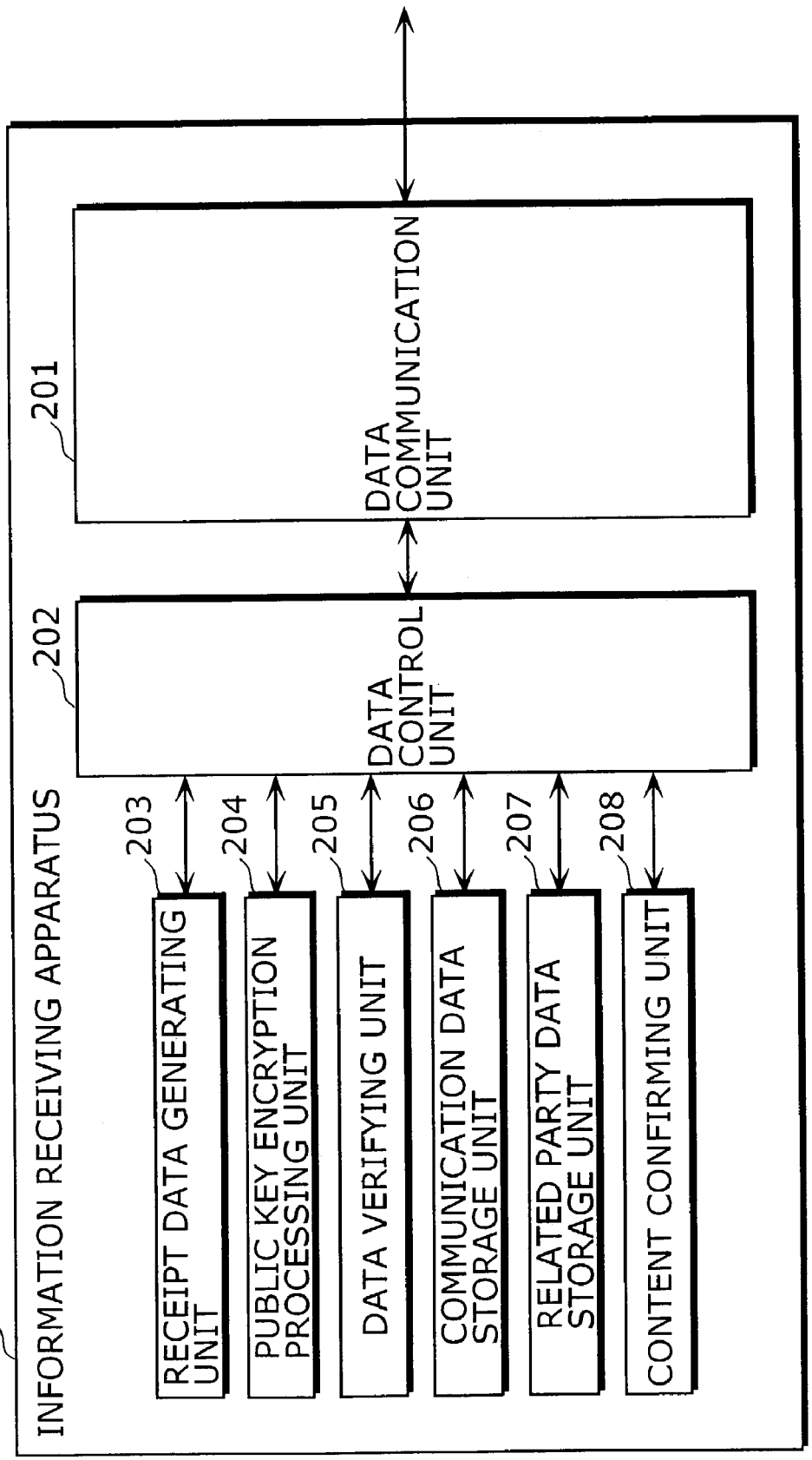
FIG. 3 shows the hardware construction of an information receiving apparatus according to the embodiment of the present invention.

FIG. 3 shows the hardware construction of the information receiving apparatus 20. The information receiving apparatus 20 includes a data communication unit 201, a data control unit 202, a receipt data generating unit 203, a public key encryption processing unit 204, a data verifying unit 205, a communication data storage unit 206, a related party data storage unit 207, and a content confirming unit 208.

The data communication unit 201 transmits and receives data to and from the outside. The data control unit 202 controls the inputting and outputting of data to and from the various parts of the information receiving apparatus 20. The receipt data generating unit 203 generates receipt data. The public key encryption processing unit 204 performs processing in accordance with a public key encryption method. The data verifying unit 205 checks the consistency of the data transmitted from the information providing apparatus 10. The communication data storage unit 206 stores the data exchanged between the information receiving apparatus 20 and the information providing apparatus 10 or the dispute resolution apparatus 30. The related party data storage unit 207 stores data relating to related parties in an exchange procedure. The content confirming unit 208 confirms whether the content data transmitted from the information providing apparatus 10 is correct.

Figure 4:
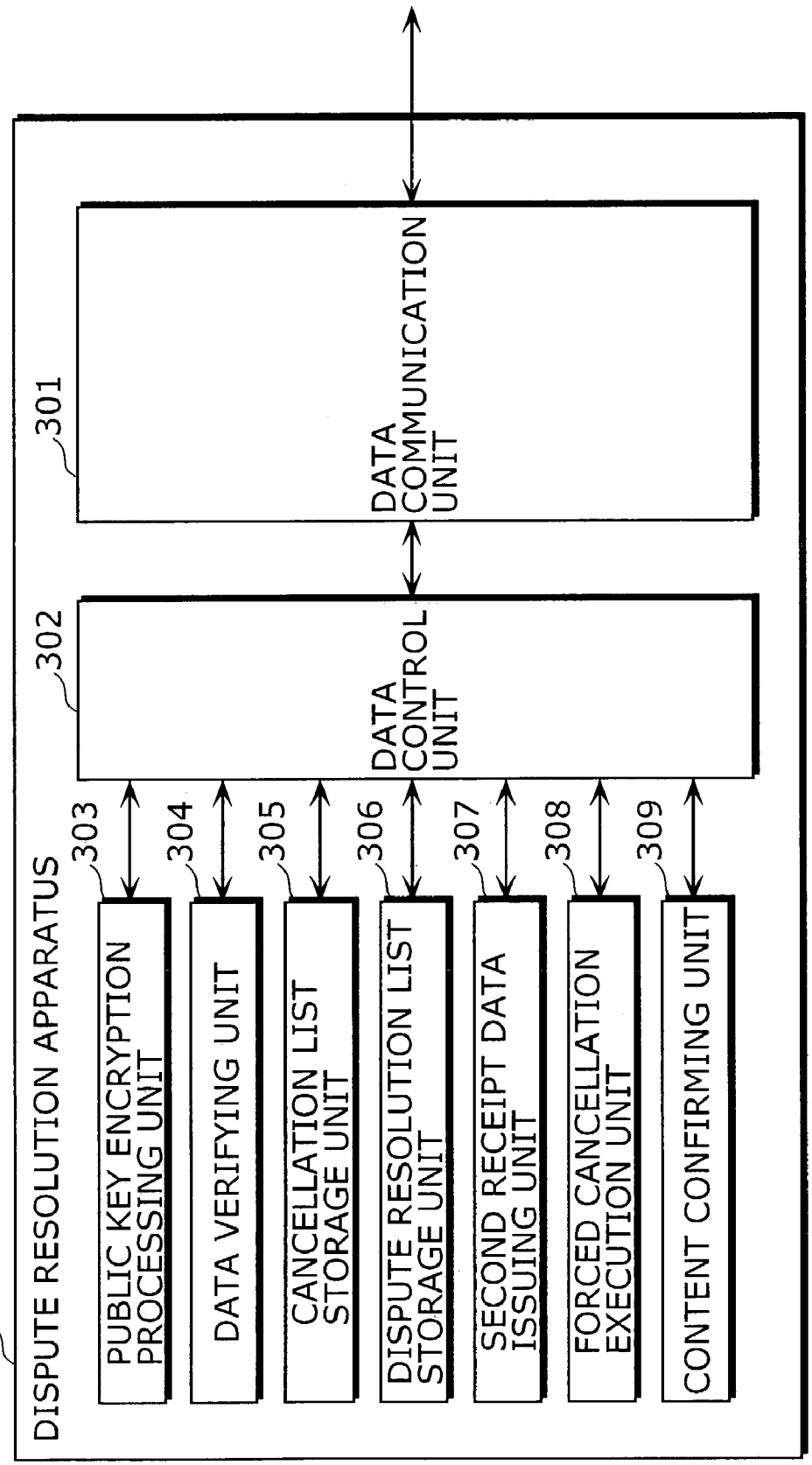
FIG. 4 shows the hardware construction of a dispute resolution apparatus according to the embodiment of the present invention.

FIG. 4 shows the hardware construction of the dispute resolution apparatus 30. The dispute resolution apparatus 30 includes a data communication unit 301, a data control unit 302, a public key encryption processing unit 303, a data verifying unit 304, a cancellation list storage unit 305, a dispute resolution list storage unit 306, a second receipt data issuing unit 307, a forced cancellation execution unit 308, and a content confirming unit 309.

The data communication unit 301 transmits and receives data to and from the outside. The data control unit 302 controls the inputting and outputting of data to and from the various parts of the dispute resolution apparatus 30. The public key encryption processing unit 303 performs processing in accordance with a public key encryption method. The data verifying unit 304 checks the consistency of the data transmitted from the information providing apparatus 10 or the information receiving apparatus 20. The cancellation list storage unit 305 stores the cancellation list which is described later. The dispute resolution list storage unit 306 stores the dispute resolution list which is also described later. In place of the information receiving apparatus 20, the second receipt data issuing unit 307 issues the second receipt data keyR described later to the information providing apparatus 10. When an illegal act by the information providing apparatus 10 has been discovered, the forced cancellation execution unit 308 forcibly cancels the transaction. The content confirming unit 309 confirms that there are no discrepancies between the content of the provided information description data dO, which is described later, and the content of the content data.

Figure 5:
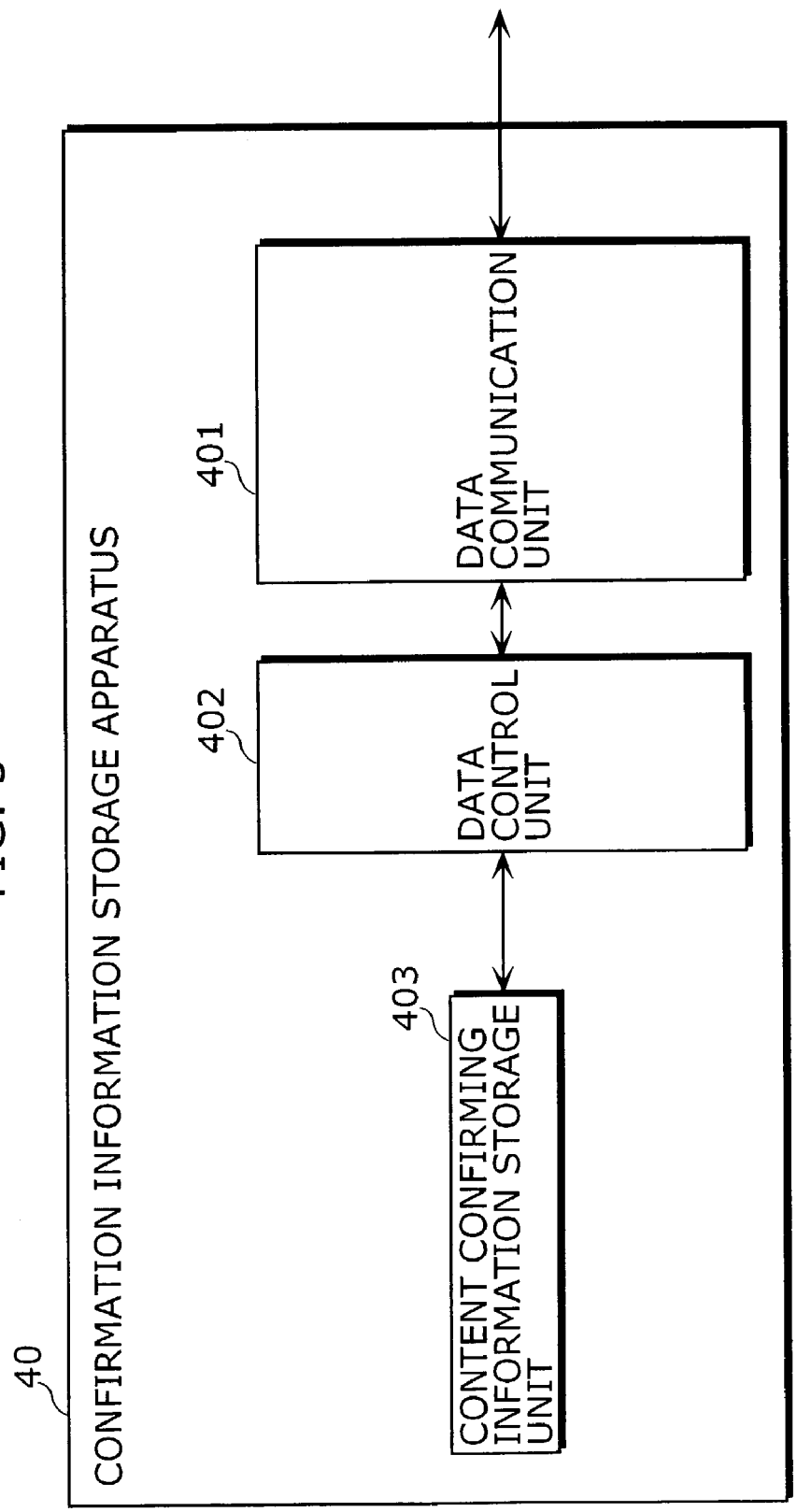
FIG. 5 shows the hardware construction of a confirmation information storage apparatus according to the embodiment of the present invention.

FIG. 5 shows the hardware configuration of the confirmation information storage apparatus 40. The confirmation information storage apparatus 40 includes a data communication unit 401, a data control unit 402, and a content confirming information storage unit 403.

The data communication unit 401 transmits and receives data to and from the outside. The data control unit 402 controls the inputting and outputting of data to and from the various parts of the confirmation information storage apparatus 40. The content confirming information storage unit 403 stores content confirming information for confirming whether the content data supplied from the information providing apparatus 10 to the information receiving apparatus 20 is genuine or fake.

The following describes the procedures executed by the present information providing system. The information providing system executes four procedures, namely an "exchange procedure", a "cancellation procedure", a "provider dispute resolution procedure", and a "receiver dispute resolution procedure".

The "exchange procedure" is a procedure for exchanging content data and a receipt between the information providing apparatus 10 and the information receiving apparatus 20. When this exchange procedure is performed successfully, the other three procedures are not performed.

The "cancellation procedure" is a procedure that is performed between the information providing apparatus 10 and the dispute resolution apparatus 30, and is executed to cancel the exchange protocol when the exchange protocol has not been performed successfully.

The "provider dispute resolution procedure" is a procedure that is performed between the information providing apparatus 10 and the dispute resolution apparatus 30 and is performed to resolve a dispute that occurs when the exchange procedure has not been performed successfully, with the information providing apparatus 10 not having been able to receive a receipt from the information receiving apparatus 20 despite transmitting the content data to the information receiving apparatus 20.

The "receiver dispute resolution procedure" is a procedure that is performed between the information receiving apparatus 20 and the dispute resolution apparatus 30 and is performed to resolve a dispute that occurs when the exchange procedure has not been performed successfully, with the information receiving apparatus 20 not having been able to receive the content data from the information providing apparatus 10.

The following describes each of these procedures. Note that in each procedure, the data that is exchanged between the various apparatuses is transmitted via a secure communication path established in advance using SSL (Secure Socket Layer) protocol.

Initial Settings

Each of the information providing apparatus 10 and the information receiving apparatus 20 is assumed to have generated a public key and a secret key for a public key encryption method in advance and to have made their respective public keys available in a public key register (not shown in the drawing) on the network. In the same way, the dispute resolution apparatus 30 is assumed to have generated a public key and a secret key and to have made the public key available in the public key register. Any public key encryption method may be used, though the ElGamal encryption method is used here. The ElGamal encryption method is described in "Gendai Angou" (Contemporary Encryption) by Tatsuaki Okamoto and Hirosuke Yamamoto (published by Sangyou Tosho).

Exchange Procedure

The exchange procedure is executed when content data and a receipt are exchanged between the information providing apparatus 10 and the information receiving apparatus 20. The following describes the exchange procedure in detail.

Figure 6:
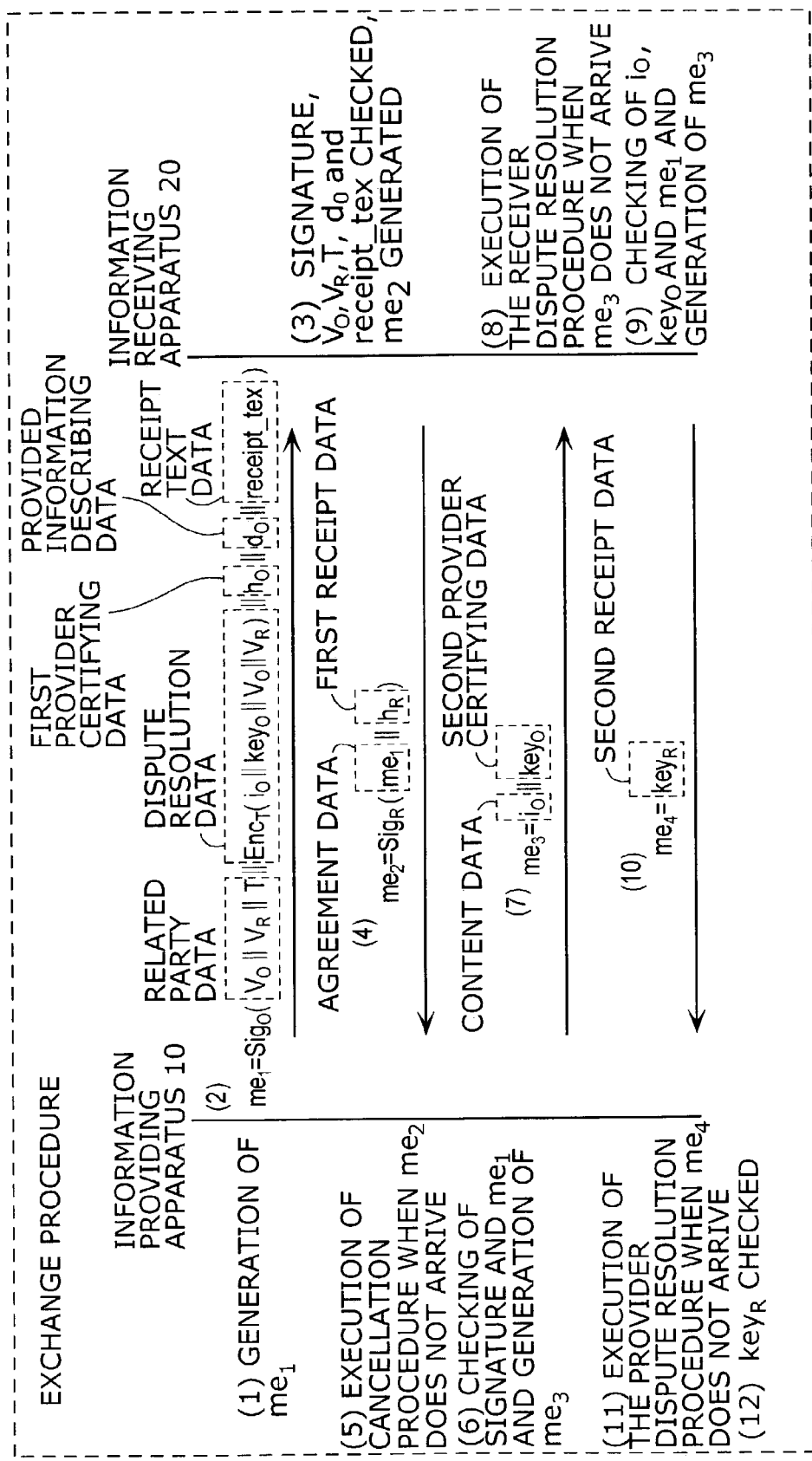
FIG. 6 shows the composition of the exchange procedure according to the embodiment of the present invention.

FIG. 6 shows the procedure for the exchanging of data between the information providing apparatus 10 and the information receiving apparatus 20 in the exchange procedure. Based on FIG. 6, the following describes the operation of the information providing apparatus 10 and the information receiving apparatus 20 during the exchange procedure, with further reference to FIGS. 2 and 3.

(0) Request for the Provision of Information

First, the information receiving apparatus 20 requests the information providing apparatus 10 to provide information. After this request is made, both apparatuses obtain each other's public key from the public key directory, with these keys being respectively stored in the related party data storage units 106 and 207. The information providing apparatus 10 also obtains the public key of the dispute resolution apparatus 30 and stores this public key in the related party data storage unit 106.

(1) Generation of Data me1

Under the control of the data control unit 102, the various parts of the information providing apparatus 10 generate data me1 that includes related party data, dispute resolution data, first provider certifying data, provided information describing data, and receipt text data.

Related Party Data

The related party data storage unit 106 links the public key VO of the information providing apparatus 10, the public key VR of the information receiving apparatus 20, and the public key T of the dispute resolution apparatus 30 that are stored to generate the related party data. This is to say, the related party data is generated according to expression (18) below.

$$VO\|VR\|T \quad (18)$$

Here, the operator "||" represents the linking of data. The related party data storage unit 106 transmits the related party data it has generated to the data control unit 102.

Dispute Resolution Data

The provider certifying data generating/storage unit 103 has the second provider certifying data keyO generated randomly and stores the result. The public key encryption processing unit 104 links the content data iO stored by the provided information storage unit 107, the second provider certifying data keyO stored by the provider certifying data generating/storage unit 103, and the public key VO of the information providing apparatus 10 and the public key VR of the information receiving apparatus 20 that are stored by the related party data storage unit 106, and encrypts the linked data using the public key T of the dispute resolution apparatus 30 stored by the related party data storage unit 106 to generate the dispute resolution data. This is to say, the dispute resolution data is generated according to expression (19) below.

$$EncT(iO\|keyO\|VO\|VR) \quad (19)$$

Here, EncT(X) represents the result obtained when input data X is encrypted using the public key T. The public key encryption processing unit 104 transmits the generated dispute resolution data to the data control unit 102.

First Provider Certifying Data

The provider certifying data generating/storage unit 103 generates the first provider certifying data hO from the second provider certifying data keyO that the provider certifying data generating/storage unit 103 itself stores in accordance with equation (20) below, and stores the generated first provider certifying data hO.

$$hO = HASH(keyO) \quad (20)$$

Here, HASH (X) represents the value of a hash function for input data X, which is to say, the hash value for the input data X. The SHA-1 (Secure Hash Algorithm 1) method is used as the process for calculating this hash value HASH (X). The SHA-1 (Secure Hash Algorithm 1) method is described in "Gendai Angou" (Contemporary Encryption) by Tatsuaki Okamoto and Hirosuke Yamamoto (published by Sangyou Tosho), for example.

The provider certifying data generating/storage unit 103 transmits the first provider certifying data hO that it stores to the data control unit 102.

Provided Information Description Data

The provided information storage unit 107 transmits the provided information description data dO that is stored in advance to the data control unit 102. The provided information description data dO describes the content of the content data iO. As one example, when the content data iO is music data, the provided information description data dO is the title(s) of the track(s), etc.

Receipt Text Data

The receipt text generating unit 105 generates the receipt text data receipt_tex. The receipt text data receipt_tex only needs to include sufficient information for a billing process, though in the present embodiment, the receipt text data receipt_tex includes the sum to be paid in exchange for the content data iO that is provided and the time and date of the transaction. The receipt text generating unit 105 transmits the receipt text data receipt_tex to the data control unit 102.

The data control unit 102 receives the five pieces of data described above, links these pieces of data, and transmits the result to the public key encryption processing unit 104. The public key encryption processing unit 104 digitally signs the linked data using the secret key of the information providing apparatus 10 that is stored in the related party data storage unit 106, thereby generating the data me1. This is to say, the data me1 is generated according to expression (21) below.

$$me1 = SigO(VO\|VR\|T\|EncT(iO\|keyO\|VO\|VR)\|hO\|dO\| \text{ receipt\_tex}) \quad (21)$$

Here, SigO(X) represents the result produced when the input data X is signed using the secret key of the information providing apparatus 10.

Here, the ElGamal signing method is used as the digital signing method. The ElGamal signing method is described in "Gendai Angou" (Contemporary Encryption) by Tatsuaki Okamoto and Hirosuke Yamamoto (published by Sangyou Tosho), for example.

The public key encryption processing unit 104 transmits the data me1 it has generated to the data control unit 102. The data control unit 102 receives the data me1 from the public key encryption processing unit 104 and transfers the data me1 to the data communication unit 101 and the communication data storage unit 109.

(2) Transmission of the Data me1

The data communication unit 101 transmits the data me1 received in process (1) to the information receiving apparatus 20.

(3) Checking the Data me1 and Generation of Data me2

The data communication unit 201 of the information receiving apparatus 20 receives the data me1 and stores the data me1 in the communication data storage unit 206 via the data control unit 202.

The public key encryption processing unit 204 uses the public key VO of the information providing apparatus 10 that is stored in the related party data storage unit 207 to verify the signature of the information providing apparatus 10 that has been applied to the data me1.

Next, the data verifying unit 205 checks whether the related party data (VO, VR, T), the provided information description data dO, and the receipt text data receipt_tex included in the data me1 are correct, and only when all of such data are correct, transmits a generation permission signal for the data me2 to the data control unit 202. When any of such data is not correct, the data verifying unit 205 transmits a generation prohibition signal for the data me2 to the data control unit 202 and so cancels the procedure for generating the data me2.

When the generation permission signal for the data me2 has been transmitted, under the control of the data control unit 202, agreement data me1 and first receipt data are generated as shown below, and then the data me2 is generated.

Agreement Data me1

The agreement data me1 is the same as the data me1 stored in the communication data storage unit 206. The communication data storage unit 206 transmits the agreement data me1 to the data control unit 202.

First Receipt Data

The receipt data generating unit 203 has the second receipt data keyR randomly generated_and generates the first receipt data hR according to expression (22) below.

$$hR = \text{HASH}(keyR) \tag{22}$$

The receipt data generating unit 203 transmits the first receipt data hR to the data control unit 202. It should be noted that the hash function HASH(X) shown in expression (22) is the same as the hash function HASH(X) that was shown in expression (20).

The data control unit 202 receives the agreement data me1 and the first receipt data hR and then links such data and transmits the linked result to the public key encryption processing unit 204. The public key encryption processing unit 204 digitally signs the linked data using the secret key of the information receiving apparatus 20 that is stored in the related party data storage unit 207, thereby generating the data me2. This is to say, the data me2 is expressed by expression (23) below.

$$me2 = SigR(me1 \| hR) \tag{23}$$

Here, the term "SigR(X)" represents the result when X has been signed using the secret key of the information receiving apparatus 20.

The public key encryption processing unit 204 transmits the data me2 to the data control unit 202. The data control unit 202 receives the data me2 and transfers the received data me2 to the communication data storage unit 206 and the data communication unit 201.

(4) Transmission of the Data me2

The data communication unit 201 transmits the data me2 generated in process (3) to the information providing apparatus 10.

(5) Execution of the Cancellation Procedure When Data me2 Does Not Arrive

When the data me2 that should have been transmitted from the information receiving apparatus 20 has not arrived within a predetermined period, or when the data me2 has not been retransmitted from the information receiving apparatus 20 within a predetermined period following the output of a retransmission request for the data me2 in process (6) described below, the information providing apparatus 10 cancels the subsequent processing and executes the "cancellation procedure" described later. When the information providing apparatus 10 has received the data me2 within the predetermined period, process (6) below is executed.

(6) Checking the Data me2 and Generation of Data me3

The public key encryption processing unit 104 of the information providing apparatus 10 checks whether the signature of the information receiving apparatus 20 that relates to the received data me2 is correct. Next, the data verification unit 108 checks whether the agreement data me1 included in the data me2 matches the data me1 stored in the communication data storage unit 109. Only when the checks performed by both the public key encryption processing unit 104 and the data verification unit 108 find that the data is correct, the data me3 is generated under the control of the data control unit 102. When either of the checks finds that the data is incorrect, the information providing apparatus 10 transmits a retransmission request signal for the data me2 to the information receiving apparatus 20 and the control returns to process (5). The data me3 includes the content data iO and the second provider certifying data keyO shown below.

Content Data iO

The provided information storage unit 107 transmits the content data iO stored by the provided information storage unit 107 to the data control unit 102.

Second Provider Certifying Data

The provider certifying data generating/storage unit 103 transmits the second provider certifying data keyO generated and stored in the provider certifying data generating/storage unit 103 in process (1) to the data control unit 102.

The data control unit 102 receives the content data iO and the second provider certifying data keyO and links such data to generate the data me3. This is to say, the data me3 satisfies the relationship shown by expression (24) below. The data control unit 102 transfers the generated data me3 to the communication data storage unit 109 and the data communication unit 101.

$$me3 = iO \| keyO \tag{24}$$

(7) Transmission of the Data me3

The data communication unit 101 transmits the data me3 to the information receiving apparatus 20.

(8) Execution of the Receiver Dispute Resolution Procedure When Data me3 Does Not Arrive When the data me3 that should have been transmitted from the information providing apparatus 10 has not arrived within a predetermined period, or when the data me3 has not been retransmitted from the information providing apparatus 10 within a predetermined period following the output of a retransmission request for the data me3 in process (9) described below, the information receiving apparatus 20 cancels the subsequent processing and executes the "receiver dispute resolution procedure" described later. When the information receiving apparatus 20 has received the data me3 within the predetermined period, process (9) below is executed.

(9) Checking the Data me3 and Generation of Data me4

The content confirming unit 208 of the information receiving apparatus 20 confirms whether the content data iO included in the received data me3 matches the content of the provided information description data dO included in the data me1 stored in the communication data storage unit 206.

Figure 7:
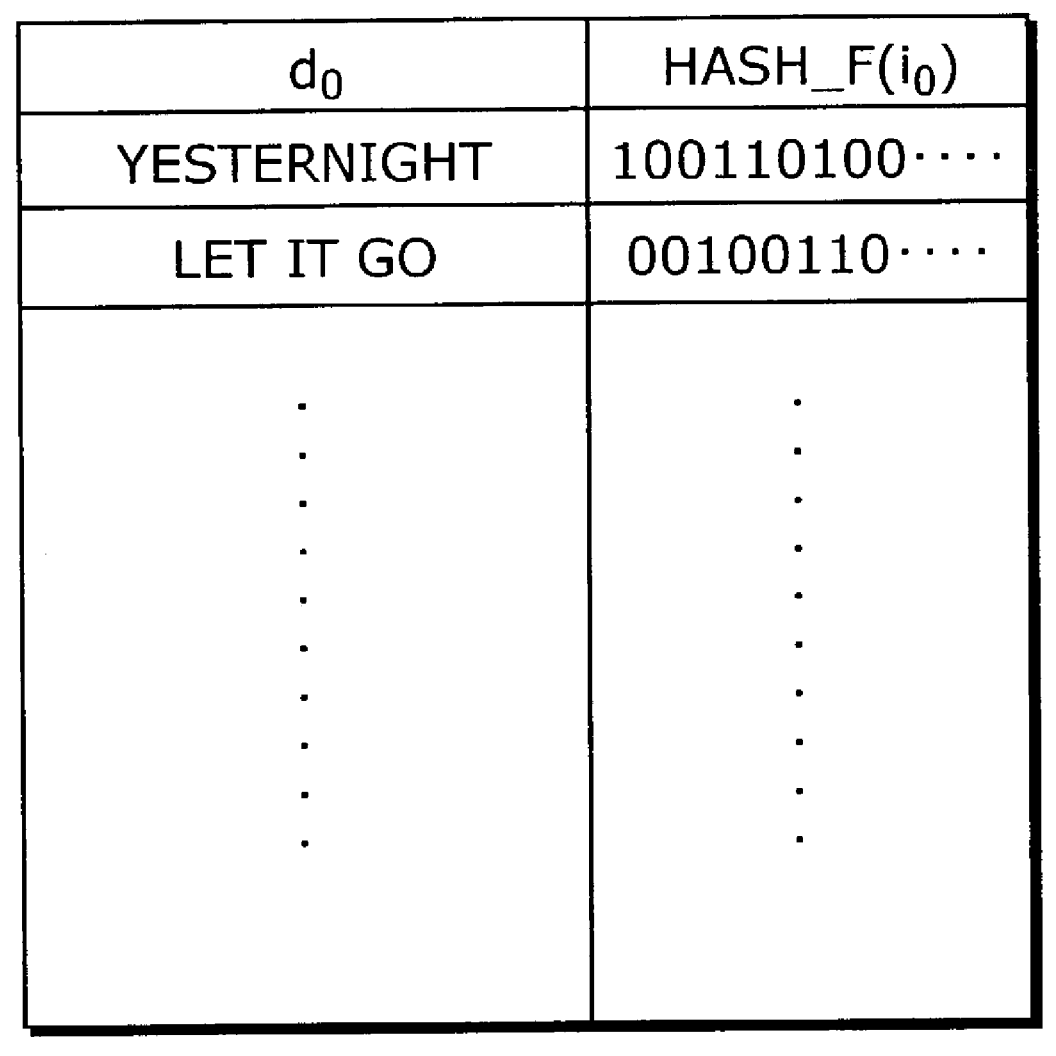

The following describes the method of confirming whether the content data iO matches the content written in the provided information description data dO, based on a specific example. FIG. 7 shows an example of the content confirming information stored in the content confirmation information storage unit 403 of the confirmation information storage apparatus 40. The content confirmation information is composed of a combination of the provided information description data dO and a value of a hash function HASH_F that has the content data iO as an input (which is to say, the hash value HASH_F (iO)). In this case, the content data iO is music data and the provided information description data dO are track titles for the music data. As one example, a combination of the provided information description data dO that is the track title "Yesternight" for music data and the hash value HASH_F(iO) for the music data is stored in the content confirming information storage unit 403 as the content confirmation information.

The content confirming unit 208 transmits the provided information description data dO to the confirmation information storage apparatus 40. The content confirming information storage unit 403 of the confirmation information storage apparatus 40 receives the transmitted provided information description data dO and transmits the hash value HASH_F (iO) that corresponds to the provided information description data dO to the information receiving apparatus 20.

The content confirming unit 208 has a hash function HASH_F that is the same as the hash function used when a hash value is calculated by the content confirming information storage unit 403. The content confirming unit 208 calculates the hash value HASH_F (iO) using this hash function HASH_F present in the content confirming unit 208 with the content data iO included in the received data me3 as an input. The content confirming unit 208 investigates whether the hash value HASH_F (iO) it has calculated in this way is the same as the hash value HASH_F (iO) received from the confirmation information storage apparatus 40. When the values match, the content confirming unit 208 judges that the content data iO included in the received data me3 matches the content written in the provided information description data dO included in the data me1 stored in the communication data storage unit 206.

Next, the data verifying unit 205 confirms whether the second provider certifying data keyO is authentic. Here, the authenticity of the second provider certifying data keyO is confirmed according to whether the relationship shown in expression (25) below is satisfied for the first provider certifying data hO included in the data me1 stored in the communication data storage unit 206.

$$hO=\text{HASH}(keyO) \quad (25)$$

Only when the above confirmations executed by the content confirming unit 208 and the data verifying unit 205 are all successful, which is to say, only when the data me3 has been determined to be authentic, the data control unit 202 controls the various parts of the information receiving apparatus 20 to generate the data me4.

When any of the confirmations is not successful, the information receiving apparatus 20 uses the data control unit 202 and the data communication unit 201 to request the information providing apparatus 10 to retransmit the data me3, and the control returns to process (8).

The data me4 is generated as shown below. The receipt data generating unit 203 transmits the second receipt data keyR stored by the receipt data generating unit 203 to the data control unit 202. The data control unit 202 receives the second receipt data keyR from the receipt data generating unit 203 and transfers the received second receipt data keyR to the communication data storage unit 206 and the data communication unit 201 as the data me4. This is to say, the data me4 satisfies the relationship shown in expression (26) below.

$$me4=keyR \quad (26)$$

(10) Transmission of the Data me4

The data communication unit 201 transmits the data me4 to the information providing apparatus 10.

(11) Execution of the Provider Dispute Resolution Procedure when the Data me4 does not Arrive When the data me4 that should have been transmitted from the information receiving apparatus 20 has not arrived within a predetermined period, or when the data me4 has not been retransmitted from the information receiving apparatus 20 within a predetermined period following the output of a retransmission request for the data me4 in process (12) described below, the information providing apparatus 10 cancels the subsequent processing and executes the "provider dispute resolution procedure" described later. When the information providing apparatus 10 has received the data me4 within the predetermined period, process (12) below is executed.

(12) Checking the Data me4

The data verification unit 108 of the information providing apparatus 10 checks whether the second receipt data keyR is authentic based on the received data me4. Here, the authenticity of the second receipt data keyR is confirmed according to whether the relationship shown in expression (27) below is satisfied for the first receipt data hR included in the data me2 stored in the communication data storage unit 109.

$$hR=\text{HASH}(keyR) \quad (27)$$

When the above relationship is satisfied, the exchange procedure is successfully completed. At this point, the receipt received by the information providing apparatus 10 is the data me2 and the data me4. A third party in an impartial position between the information provider 1 and the information receiver 2 confirms the signature of the information receiving apparatus 20 that has been applied to the data me2 and then confirms whether the relationship shown by expression (28) below is established for the first receipt data hR included in the data me2 and the second receipt data keyR included in the data me4.

$$hR=\text{HASH}(keyR) \quad (28)$$

The third party also confirms the content of the receipt according to the receipt text data receipt_tex included in the agreement data me1 obtained from the data me2.

On the other hand, the information receiving apparatus 20 obtains the content data iO.

Cancellation Procedure

The cancellation procedure is executed between the information providing apparatus 10 and the dispute resolution apparatus 30 in a case where, in process (5) of the exchange procedure, the data me2 that should have been transmitted from the information receiving apparatus 20 has not arrived.

Figure 8:
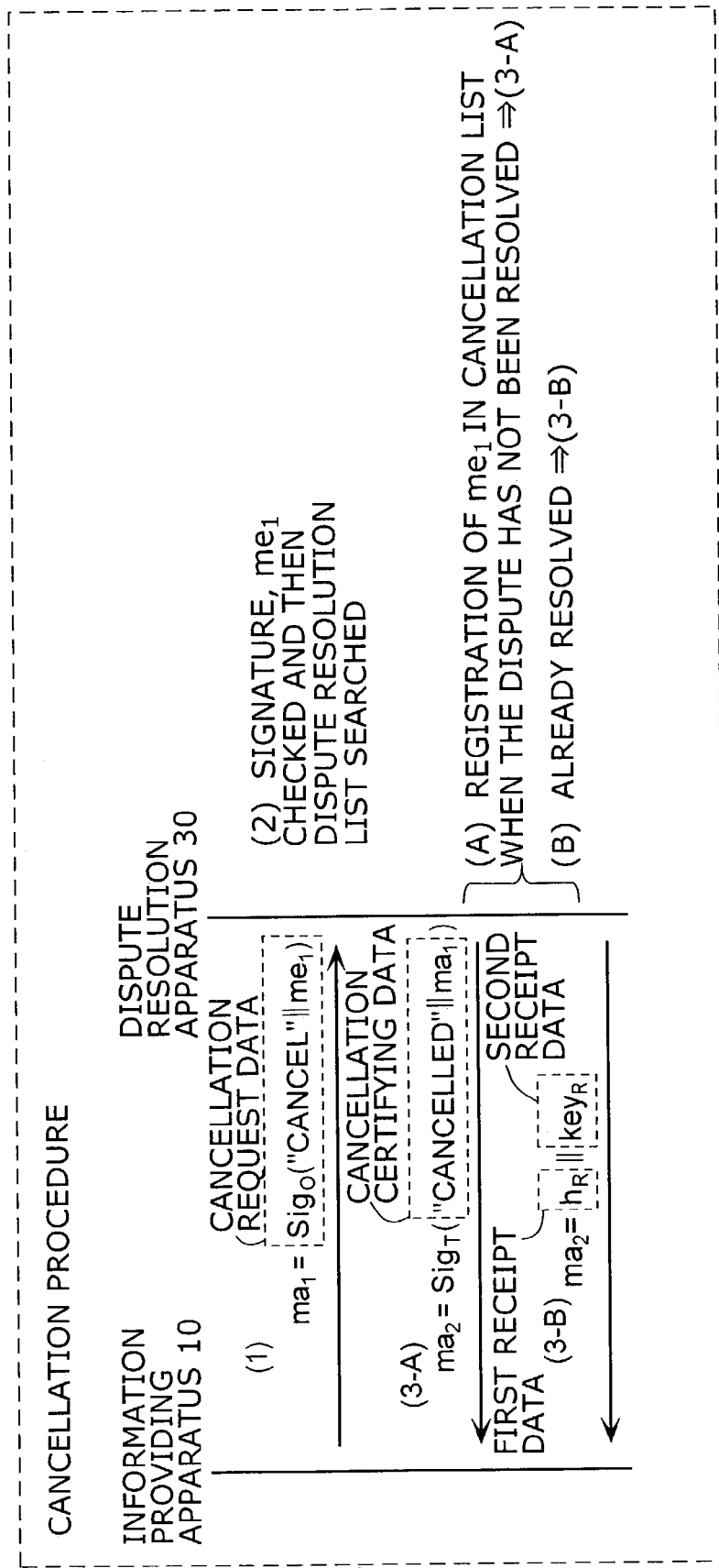
FIG. 8 shows the composition of a cancellation procedure according to the embodiment of the present invention.

FIG. 8 shows the procedure for the exchanging of data between the information providing apparatus 10 and the dispute resolution apparatus 30 in the cancellation procedure. Based on FIG. 8, the following describes the operation of the information providing apparatus 10 and the dispute resolution apparatus 30 during the cancellation procedure, with further reference to FIGS. 2 and 4.

(1) Transmission of Data ma1

The data control unit 102 of the information providing apparatus 10 links "cancellation" data, with which the information providing apparatus 10 requests the dispute resolution apparatus 30 to cancel the exchange procedure, to the data me1 that was transmitted to the information receiving apparatus 20 in process (2) of the exchange procedure and is stored by the communication data storage unit 109, and transmits the linked data to the public key encryption processing unit 104. The public key encryption processing unit 104 signs the linked data using the secret key of the information providing apparatus 10 stored in the related party data storage unit 106 to generate the data ma1 and transmits this data ma1 to the data control unit 102. The data ma1 has the relationship shown by expression (29) below.

$$ma1=\text{Sig}O(\text{"cancel"}\|me1) \quad (29)$$

The data control unit 102 transfers the data ma1 to the data communication unit 101 and the data communication unit 101 transmits the data ma1 to the dispute resolution apparatus 30.

(2) Searching the Dispute Resolution List

The public key encryption processing unit 303 of the dispute resolution apparatus 30 verifies the signature of the information providing apparatus 10 that has been applied to the data ma1, and when the signature is judged to be not authentic, the processing is cancelled. When the signature is judged to be authentic, the data verifying unit 304 checks whether the data me1 included in the data ma1 is registered in the dispute resolution list stored in the dispute resolution list storage unit 306, and depending on the checking result, either of the processes (A) and (B) that are described below is executed. The dispute resolution list is a list showing whether disputes have been resolved by the information providing apparatus 10 requesting the provider dispute resolution procedure or the information receiving apparatus 20 requesting the receiver dispute resolution procedure. When the data me1 has been registered in the dispute resolution list, this shows that a dispute between the information providing apparatus 10 and the information receiving apparatus 20 has been resolved.

(A) When the Data me1 is not Registered in the Dispute Resolution List

The data verifying unit 304 judges that a dispute has not been resolved for the transaction for which a cancellation request has been made, and adds the received data me1 to the cancellation list stored in the cancellation list storage unit 305. The cancellation list is a list that shows whether a transaction has been cancelled due to the information providing apparatus 10 requesting the cancellation procedure. If the data me1 is not registered in the cancellation list, this shows that the transaction between the information providing apparatus 10 and the information receiving apparatus 20 has been cancelled.

The data control unit 302 links "cancelled" data, which certifies that the transaction has been cancelled, to the data ma1 transmitted from the information providing apparatus 10 in process (1) and transmits the linked data to the public key encryption processing unit 303. The public key encryption processing unit 303 signs the received data using the secret key of the dispute resolution apparatus 30 to generate data ma2, and transmits this data ma2 to the information providing apparatus 10 via the data control unit 302 and the data communication unit 301. The data ma2 is expressed by expression (30) below.

$$ma2 = Sig T(\text{"cancelled"} \| ma1) \quad (30)$$

As a result of this process, the information providing apparatus 10 can obtain a certificate for the cancellation of the transaction identified by the data me1 included in the data ma1. At this point, the cancellation procedure is complete.

(B) When the Data me1 is Registered in the Dispute Resolution List

The data verifying unit 304 judges that a dispute has been resolved for the transaction for which a cancellation request has been made, and transmits a second receipt data issuing instruction to the second receipt data issuing unit 307. In response to this instruction, the second receipt data issuing unit 307 obtains the first receipt data hR and the second receipt data keyR that are stored in the dispute resolution list together with the data me1. The second receipt data issuing unit 307 transmits, via the data control unit 302 and the data communication unit 301, the first receipt data hR and the second receipt data keyR to the information providing apparatus 10 as the data ma2, thereby completing the cancellation procedure.

Provider Dispute Resolution Procedure

The provider dispute resolution procedure is executed between the information providing apparatus 10 and the dispute resolution apparatus 30 in a case where in process (11) of the exchange procedure the data me4 that should have been transmitted from the information receiving apparatus 20 has not arrived.

Figure 9:
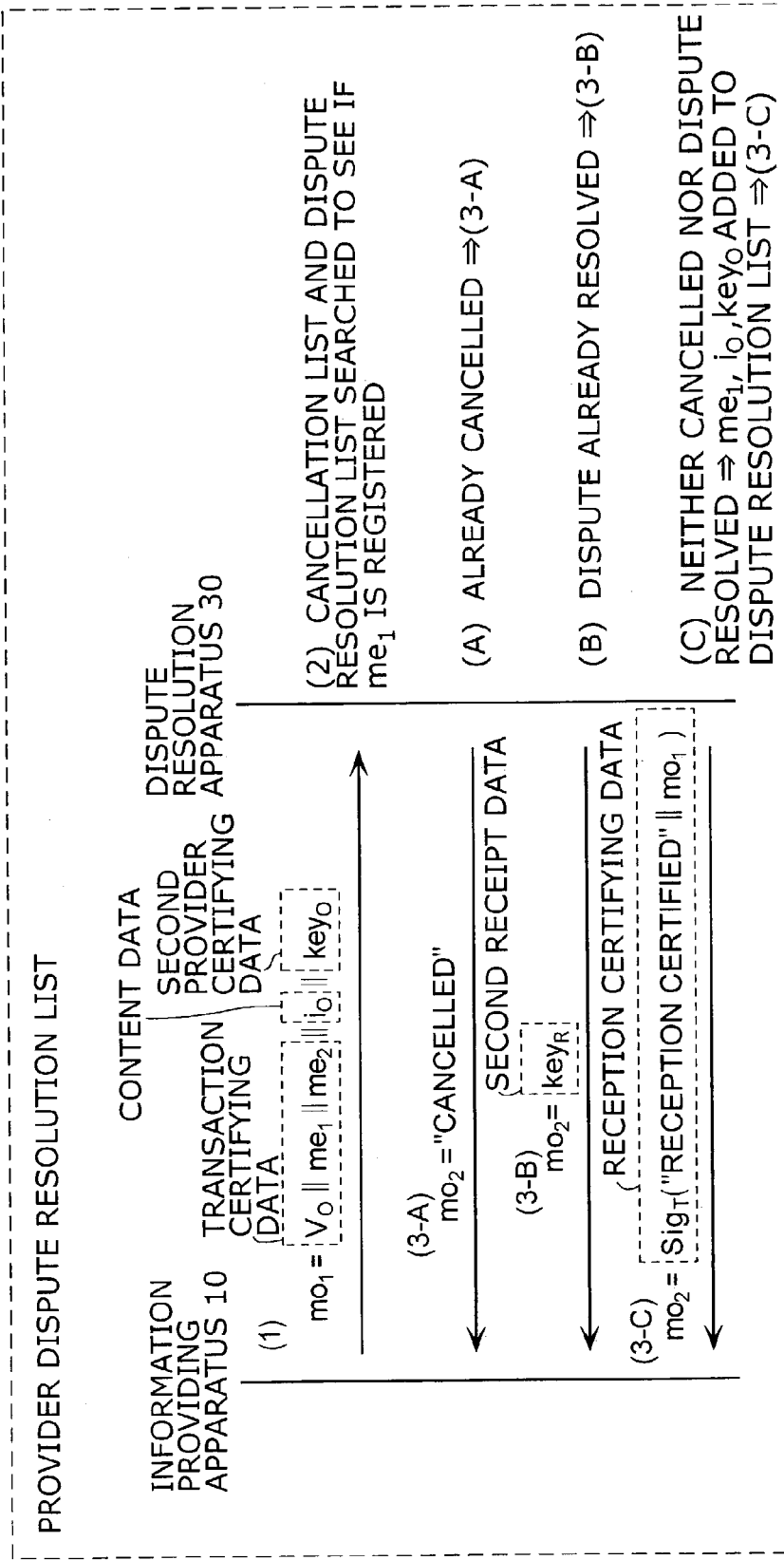
FIG. 9 shows the composition of the provider dispute resolution procedure according to the embodiment of the present invention.

FIG. 9 shows the procedure of the exchanging of data between the information providing apparatus 10 and the dispute resolution apparatus 30 during the provider dispute resolution procedure. Based on FIG. 9, the following describes the operation of the information providing apparatus 10 and the dispute resolution apparatus 30 during the provider dispute resolution procedure, with further reference to FIGS. 2 and 4.

(1) Transmission of Data mo1

The data control unit 102 in the information providing apparatus 10 links transaction certifying data, which is described below, the content data iO stored in the provided information storage unit 107, and the second provider certifying data keyO stored by the provider certifying data generating/storage unit 103 to generate the data mo1 and transmits this data mo1 via the data communication unit 101 to the dispute resolution apparatus 30. The transaction certifying data is data in which the public key VO of the information providing apparatus 10 that is stored in the related party data storage unit 106 is linked to the data me1 and the data me2 that have been exchanged in processes (2) and (4) of the exchange procedure and are stored by the communication data storage unit 109. This is to say, the data mo1 is generated according to expression (31) below.

$$mo1 = VO \| me1 \| me2 \| iO \| keyO \quad (31)$$

(2) Searching the Cancellation List

In the dispute resolution apparatus 30 that has received the data mo1, the data verifying unit 304 checks whether the data me1 included in the data mo1 has been registered in the cancellation list stored in the cancellation list storage unit 305 and the dispute resolution list stored in the dispute resolution list storage unit 306. Depending on the checking results for the cancellation list and the dispute resolution list, the dispute resolution apparatus 30 executes one of the processes (A), (B) and (C) that are described below.

(A) When the Data me1 has been Registered in the Cancellation List

The data verifying unit 304 judges that the transaction for which the dispute resolution request has been made has been cancelled. The data verifying unit 304 transmits "cancelled" data, which gives notice that the transaction has already been cancelled, via the data control unit 302 and the data communication unit 301 to the information providing apparatus 10 as the data mo2 and completes the procedure.

(B) When the Data me1 has been Registered in the Dispute Resolution List

The data verifying unit 304 judges that the "dispute has already been resolved by the information receiving apparatus 20" for the transaction for which the dispute resolution has been requested, and so transmits a second certifying data issuing instruction to the second receipt data issuing unit 307. In response to this instruction, the second receipt data issuing unit 307 obtains the second receipt data keyR that is stored in the dispute resolution list together with the data me1. The second receipt data issuing unit 307 transmits, via the data control unit 302 and the data communication unit 301, the second receipt data keyR to the information providing apparatus 10 as the data ma2, thereby completing the cancellation procedure.

(C) When the Data me1 has not Been Registered in either the Cancellation List or the Dispute Resolution List The data verifying unit 304 compares the content of the provided information description data dO that can be extracted from the data me2 included in the data mo1 with the content data iO, and cancels the processing when there is a discrepancy. The comparison process of the data verifying unit 304 for this data is the same as the processing by the content confirming unit 208 of the information receiving apparatus 20 that was described in process (9) of the exchange procedure. Accordingly, the details of this process are not repeated. It should be noted that the data verifying unit 304 has the same hash function HASH_F as the content confirming information storage unit 403.

When there is no discrepancy in such data, the data verifying unit 304 adds the data me1 included in the data mo1, the content data iO, and the second provider certifying data keyO to the dispute resolution list. After this, the data verifying unit 304 links "reception certifying" data, which is a certificate of reception by the dispute resolution agency 3, with the data mo1 received from the information providing apparatus 10 to produce data that the data verifying unit 304 transmits to the public key encryption processing unit 303. The public key encryption processing unit 303 generates the data mo2 by signing the linked data using the secret key of the dispute resolution apparatus 30 and transmits the data mo2 to the information providing apparatus 10 to complete the procedure. This is to say, the data mo2 is expressed by expression (32) below.

$$mo2 = \text{Sig}T(\text{"reception certifying"} \| mo1) \quad (32)$$

This process performs the transaction identified by the data me1 included in the data mo1, so that the information providing apparatus 10 can obtain a certificate showing that the content data iO has been received by the information receiving apparatus 20.

Receiver Dispute Resolution Procedure

The receiver dispute resolution procedure is executed between the information receiving apparatus 20 and the dispute resolution apparatus 30 in a case where in process (8) of the exchange procedure the data me3 that should have been transmitted from the information providing apparatus 10 has not arrived.

Figure 10:
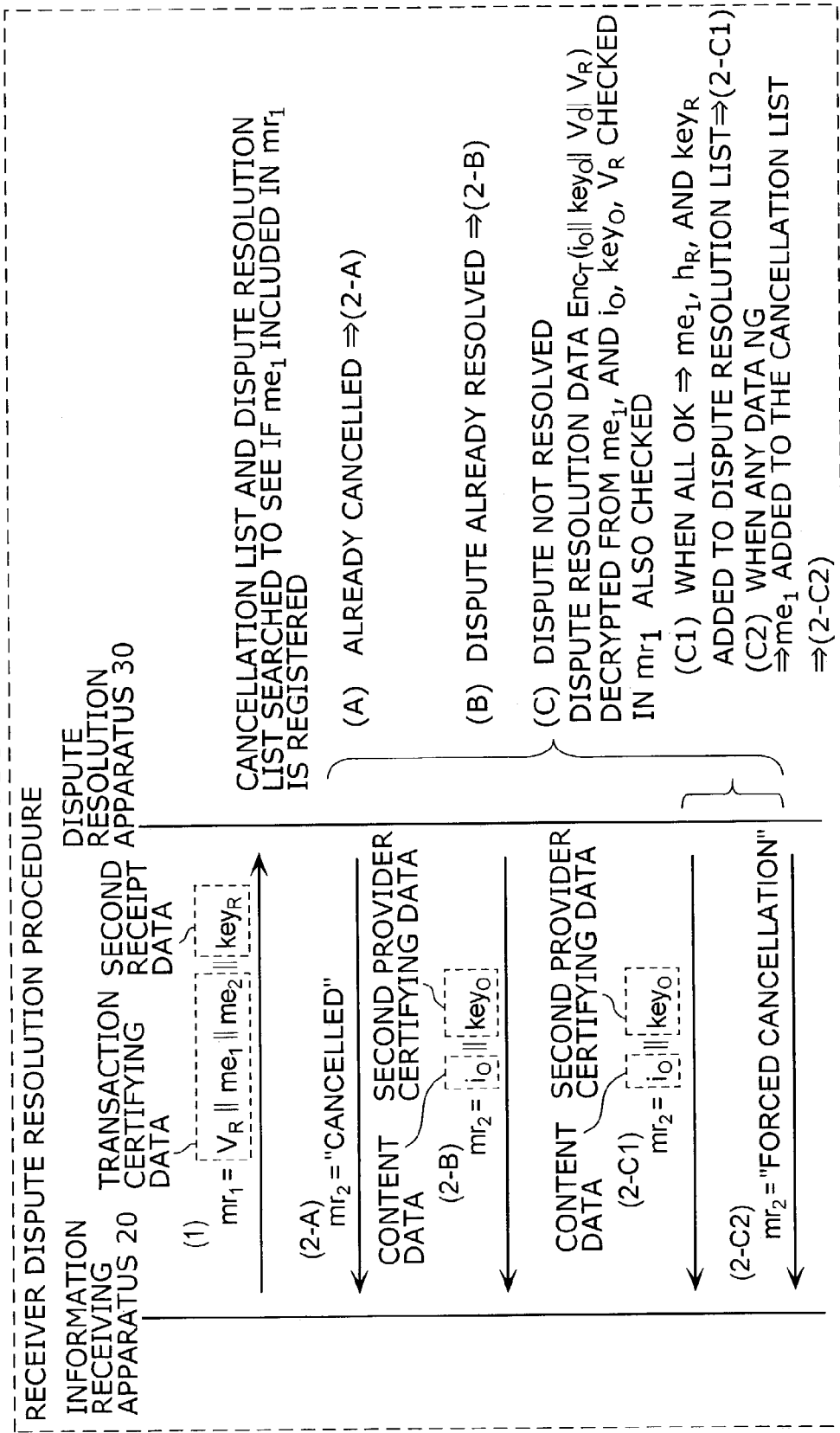
FIG. 10 shows the composition of the receiver dispute resolution procedure according to the embodiment of the present invention.
Figure 11:
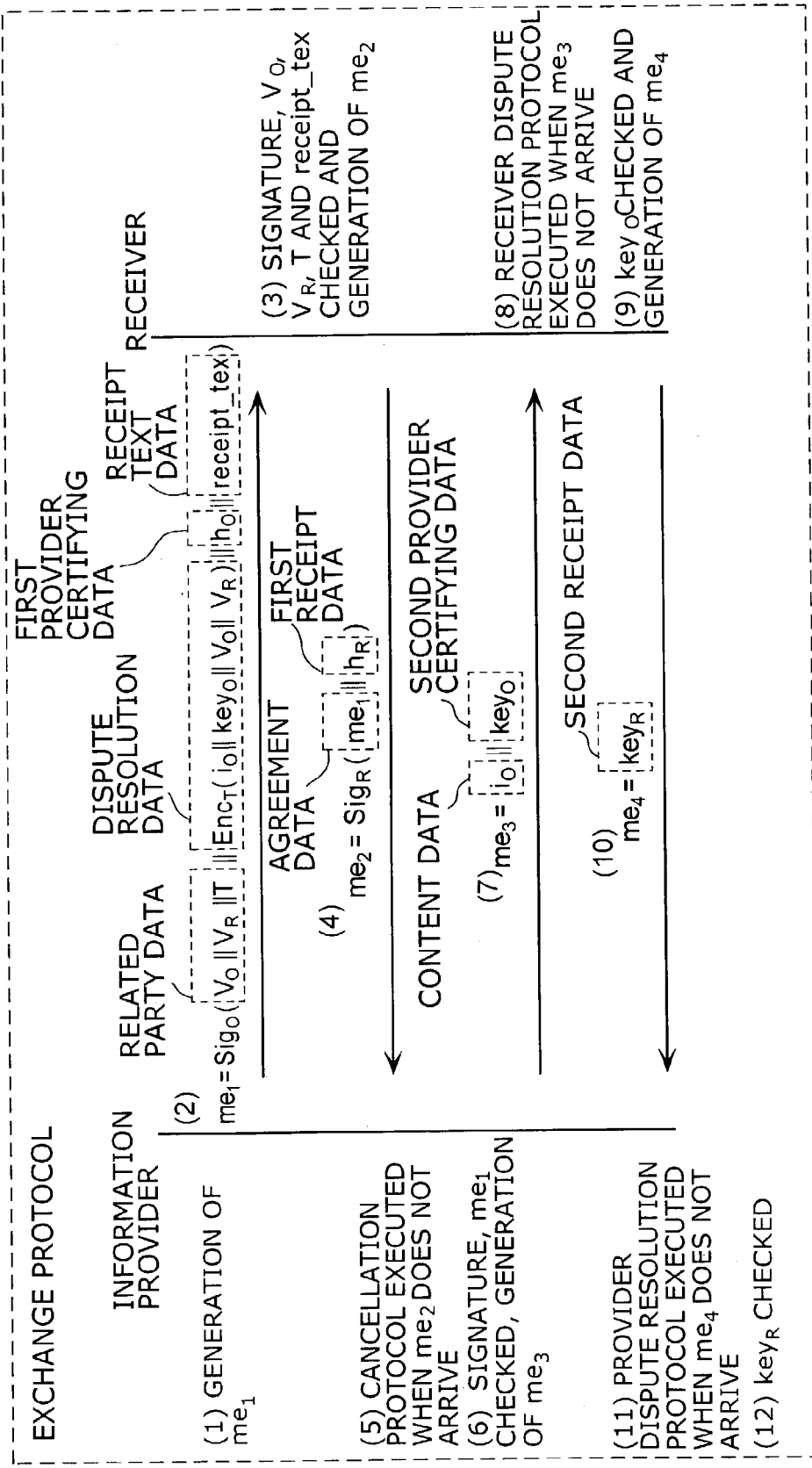
FIG. 11 shows the composition of an exchange protocol according to a prior art example for the present invention.
Figure 12:
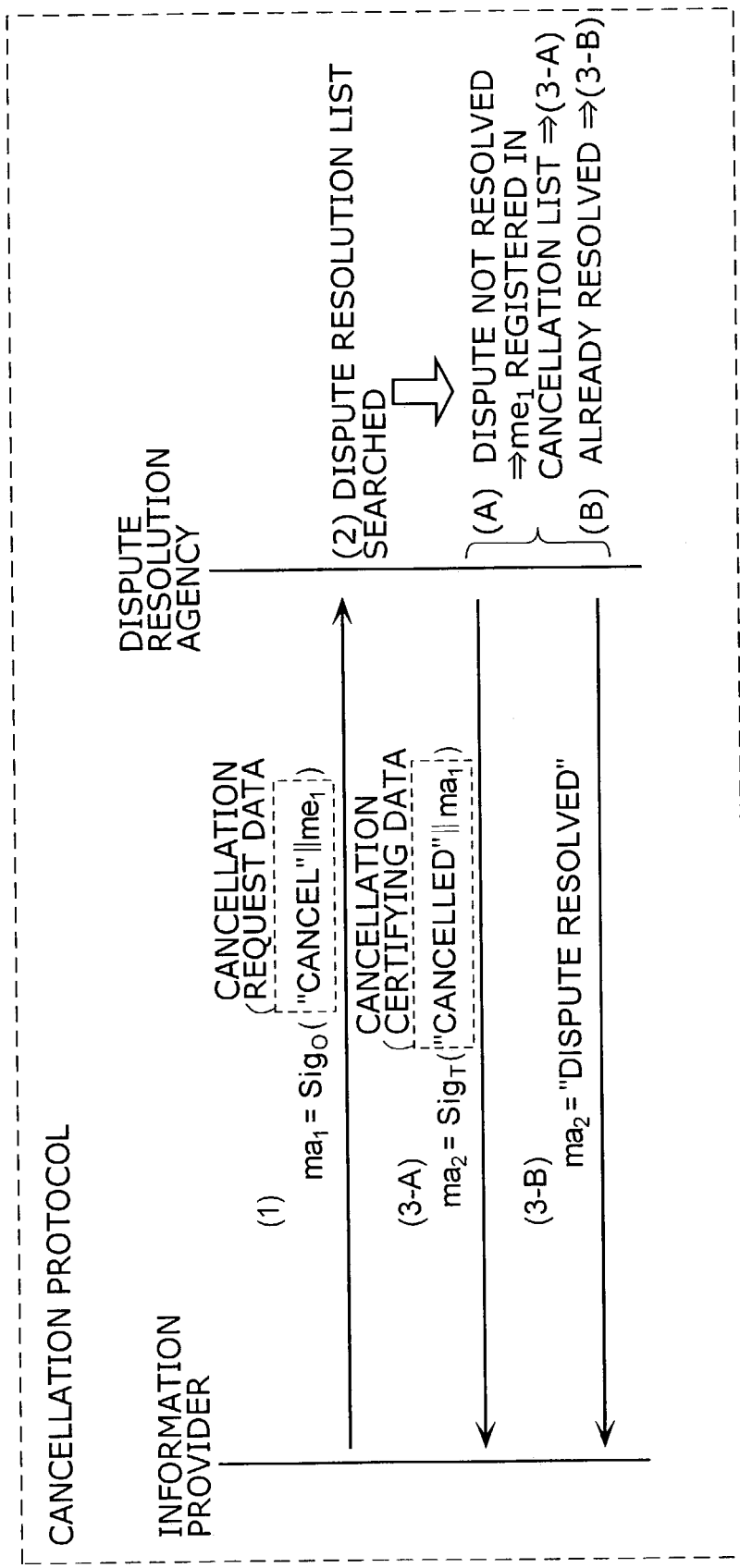
FIG. 12 shows the composition of a cancellation protocol according to the prior art example for the present invention.
Figure 13:
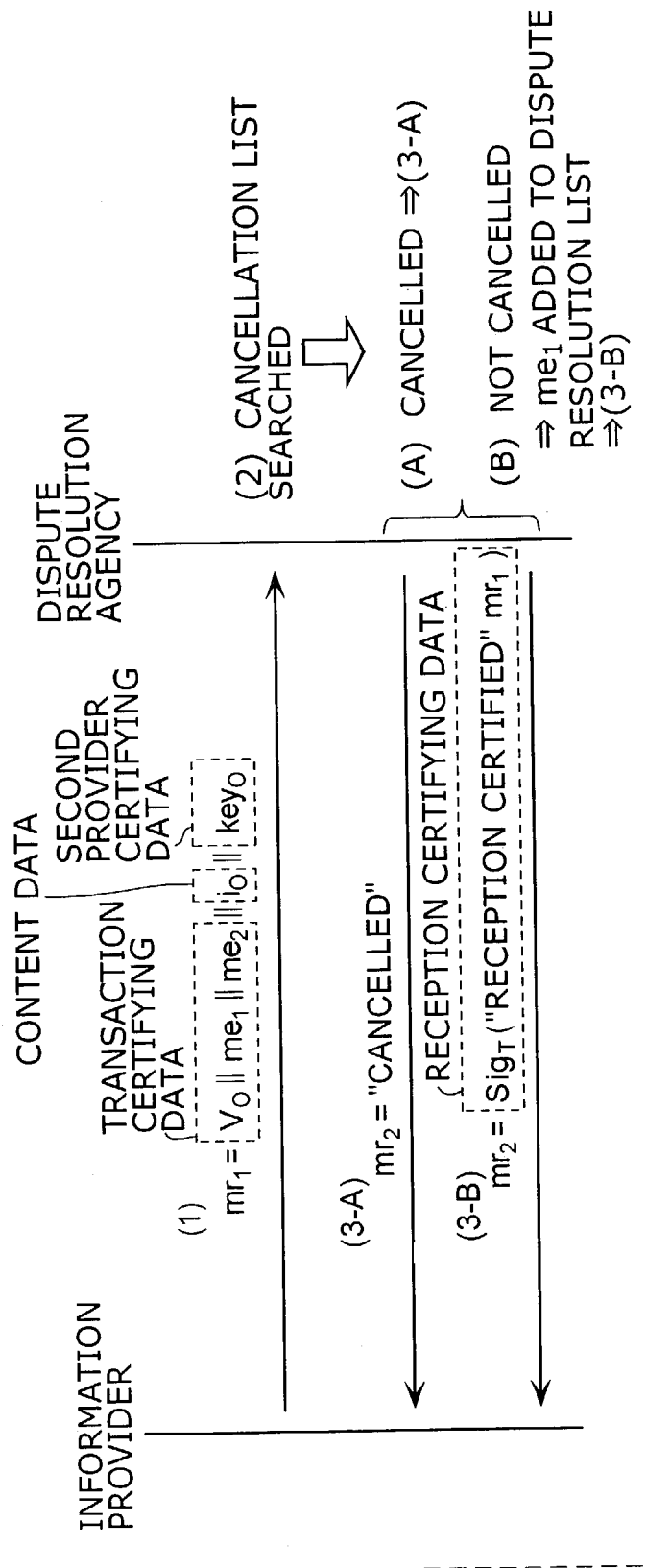
FIG. 13 shows the composition of a provider dispute resolution protocol according to a prior art example for the present invention.
Figure 14:
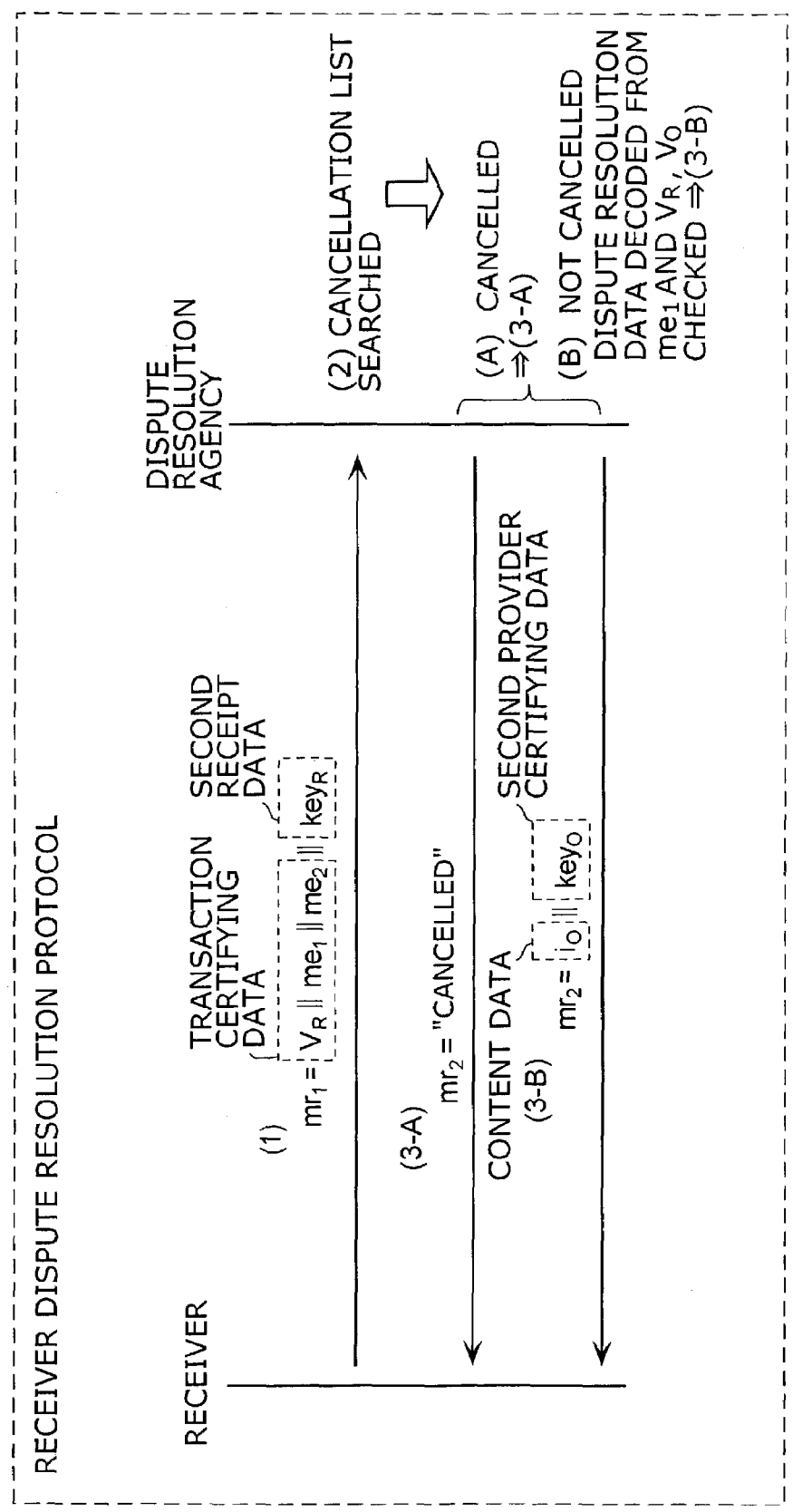
FIG. 14 shows the composition of a receiver dispute resolution protocol according to a prior art example for the present invention.

FIG. 10 shows the procedure of the exchanging of data between the information receiving apparatus 20 and the dispute resolution apparatus 30 during the receiver dispute resolution procedure. Based on FIG. 10, the following describes the operation of the information receiving apparatus 20 and the dispute resolution apparatus 30 during the receiver dispute resolution procedure, with further reference to FIGS. 2 and 4.

(1) Transmission of Data mr1

The data control unit 202 of the information receiving apparatus 20 links transaction certifying data, which is described below, and the second receipt data keyR that is stored by the receipt data generating unit 203 to generate the data mr1. The data control unit 202 transmits the data mr1 to the data communication unit 301 via the data communication unit 201. The transaction certifying data is data in which the public key VR of the information receiving apparatus 20 that is stored in the related party data storage unit 207 is linked to the data me1 and the data me2 that are stored by the communication data storage unit 206. This is to say, the data mr1 is generated according to expression (33) below.

$$mr1 = VR \| me1 \| me2 \| keyR \quad (33)$$

(2) Searching the Cancellation List and Dispute Resolution List

In the dispute resolution apparatus 30 that has received the data mr1, the data verifying unit 304 checks whether the data me1 included in the data mr1 has been registered in the cancellation list or in the dispute resolution list. Depending on the checking results, the dispute resolution apparatus 30 executes one of the processes (A), (B) and (C) that are described below.

(A) When the Data me1 has been Registered in the Cancellation List

The data verifying unit 304 judges that the transaction for which the dispute resolution request has been made has been cancelled. The data verifying unit 304 transmits "cancelled" data, which gives notice that the transaction has already been cancelled, via the data control unit 302 and the data communication unit 301 to the information receiving apparatus 20 as the data mr2 and completes the procedure.

(B) When the Data me1 has been Registered in the Dispute Resolution List

The data verifying unit 304 judges that the dispute has already been resolved by the information providing apparatus 10 for the transaction for which the dispute resolution has been requested. The data verifying unit 304 links the content data iO that is stored together with the data me1 in the dispute resolution list and the second provider certifying data keyO and transmits the linked data to the information receiving apparatus 20 as the data mr2, thereby completing the procedure. The information receiving apparatus 20 that has received the data mr2 will therefore have been able to obtain the content data iO, which means that the dispute has been resolved.

(C) When the Data me1 has not Been Registered in either the Cancellation List or the Dispute Resolution List The data verifying unit 304 judges that the transaction for which the dispute resolution has been requested has neither been cancelled nor subjected to dispute resolution, and the following processing is performed. First, the public key encryption processing unit 303 extracts the dispute resolution data EncT (iO‖keyO‖VO‖VR) from the data me1 included in the data mr1. The public key encryption processing unit 303 decrypts the extracted data using the secret key of the dispute resolution apparatus 30 and so obtains the decrypted data iO‖keyO‖VO‖VR. The data verifying unit 304 confirms whether the public key VO of the information providing apparatus 10 and the public key VR of the information receiving apparatus 20 that are included in the decrypted data match the public keys VO and VR included in the related party data of the data me1 and also whether the second provider certifying data keyO does not contradict the first provider certifying data hO included in the data me1. The content confirming unit 309 also confirms whether the content written in the provided information description data dO included in the data me1 does not contradict the content data iO included in the decrypted data. The confirmation processing of the content confirming unit 309 is the same as the processing of the content confirming unit 208 of the information receiving apparatus 20 that was described in process (9) of the exchange procedure. Accordingly, the details of this process are not repeated. It should be noted that the content confirming unit 309 has the same hash function HASH_F as the content confirming information storage unit 403.

When all the above confirmations are performed successfully (step C1), the data control unit 302 stores the data me1 included in the data mr1 in the dispute resolution list storage unit 306 along with the second receipt data keyR and the first receipt data hR included in the data me2. After this, the data control unit 302 transmits data produced by combining the content data iO and the second provider certifying data keyO to the information receiving apparatus 20 as the data mr2 and so completes the procedure. The information receiving apparatus 20 that has received the data mr2 will have been able to obtain the content data iO, which means that the dispute has been resolved.

On the other hand, when one or more of the above confirmations were not performed successfully (step C2), the data verifying unit 304 transmits a forced cancellation instruction to the forced cancellation execution unit 308. The forced cancellation execution unit 308 performs a "forced termination" of the present transaction as shown below and completes the procedure. This is to say, the forced cancellation execution unit 308 transmits "forced cancellation" data that shows the present transaction is being forcibly terminated to the information receiving apparatus 20 and adds the data me1 included in the data mr1 to the cancellation list stored in the cancellation list storage unit 305.

As described above, the information receiving apparatus 20 can receive the content data iO according to the above four procedures. By using the first provider certifying data hO and the second provider certifying data keyO that are obtained simultaneously with the content data iO, the information receiving apparatus 20 can confirm whether the content data iO has definitely been sent from the information providing apparatus 10. On the other hand, the information providing apparatus 10 can obtain a receipt that can prove to a third party that the content data iO has been received by the information receiving apparatus 20. The sum to be paid by the information receiver 2 to the information provider 1 in exchange for the content data iO is written in this receipt. This means that the information provider 1 can submit the receipt to a billing agency and so receive a payment from the information receiver 2.

In the above embodiment, the information provider cannot obtain a receipt even if fake content data is transmitted as in the prior art example. This is because during the provider dispute resolution procedure, the dispute resolution apparatus 30 compares the content of the content data iO with the content of the provided information description data dO that is agreed upon by the information providing apparatus 10 and the information receiving apparatus 20 and no receipt is issued when there is a difference in the data. Also, during the receiver dispute resolution procedure, when only incorrect content data iO can be obtained from the dispute resolution data, the transaction is forcibly cancelled by the dispute resolution apparatus 30. This means that the information providing apparatus 10 becomes unable to properly obtain a receipt from the dispute resolution apparatus 30. From the above, it can be said that the present embodiment provides improved security against illegal acts compared to the prior art. This is to say, the present embodiment achieves higher security than the prior art for a case where a billing process is performed based on a receipt.

When a dispute occurs during a transaction, the transaction can be performed fairly so that the information providing apparatus 10 and the information receiving apparatus 20 can obtain the desired data via the dispute resolution apparatus 30.

Although, the information providing system of the present invention has been described with reference to the above embodiment, the present invention is not limited to this embodiment.

Also, although the ElGamal encryption method and ElGamal signing method are used as the public key encryption methods utilized in the above embodiment, the present invention is not limited to these methods. While the SHA-1 hash method is used as the hash function process, the present invention is not limited to this method.

In the above embodiment, the content data iO is sent without amendment as the provided information, though content data that has been encrypted using an encryption key may be sent to the information receiving apparatus 20 in advance and the key data for decrypting the encrypted content data may be provided as the content data iO in the above embodiment.

In the receiver dispute resolution procedure, when the content data iO that is obtained by decrypting the dispute resolution data is not genuine, it is possible to generate a blacklist in which the public key VO of the information providing apparatus 10 who generated the dispute resolution data is recorded. This blacklist may be made available within the system, so that the occurrence of future illegal acts can be suppressed by making it possible for users to avoid making transactions with information providing apparatuses 10 that have been blacklisted.

Although SSL (Secure Socket Layer) protocol is used for the secret communication between apparatuses in the above embodiment, the present invention is not limited to this method.

The present invention makes it possible to perform highly secure transactions for content data.

When a dispute arises during a transaction, the information providing apparatus and the information receiving apparatus can receive the desired data from the dispute resolution apparatus, so that the transaction can be performed fairly.

In this way, the information providing system of the present invention makes it possible to perform transactions securely and fairly. In particular, the present invention is especially effective as a system for use for electronic trading and online auctions performed over the Internet that have become popular in recent years.

What is claimed is:

1. An information providing method for an information providing system including an information providing apparatus that provides content data and an information receiving apparatus that is connected to the information providing apparatus via a communication network and receives the content data, the information providing method comprising:
a describing data transmitting step in which the information providing apparatus transmits provided information describing data, which describes a content of the content data, to the information receiving apparatus;
a describing data receiving step in which the information receiving apparatus receives the provided information describing data from the information providing apparatus;
a first receipt data transmitting step in which the information receiving apparatus transmits first receipt data to the information providing apparatus in response to reception of the provided information describing data;
a first receipt data receiving step in which the information providing apparatus receives the first receipt data from the information receiving apparatus;

a content data transmitting step in which the information providing apparatus transmits the content data to the information receiving apparatus in response to reception of the first receipt data;

a content data receiving step in which the information receiving apparatus receives the content data from the information providing apparatus;

an authenticity confirming step in which the information receiving apparatus confirms whether the content data is authentic based on the content data and the provided information describing data;

a second receipt data transmitting step in which the information receiving apparatus transmits second receipt data to the information providing apparatus only when the content data is confirmed to be authentic in the authenticity confirming step; and a second receipt data receiving step in which the information providing apparatus receives the second receipt data from the information receiving apparatus, wherein by collecting both the first receipt data and the second receipt data, the information providing apparatus can prove that the information receiving apparatus received the content data; and wherein the information providing system further includes a dispute resolution apparatus that is connected to both the information providing apparatus and the information receiving apparatus via the communication network and resolves disputes that arise between the information providing apparatus and the information receiving apparatus, the dispute resolution apparatus having a dispute resolution list, which stores information relating to whether or not a dispute that has arisen between the information providing apparatus and the information receiving apparatus has been resolved, and a cancellation list, which stores information relating to whether an exchanging of data between the information providing apparatus and the information receiving apparatus has been cancelled, in the describing data transmitting step, the information providing apparatus transmits dispute resolution content data, which only the dispute resolution apparatus is capable of decoding, together with the provided information describing data to the information receiving apparatus, in the describing data receiving step, the information receiving apparatus receives the dispute resolution content data together with the provided information describing data from the information providing apparatus, and the content data receiving step includes:

a standby substep in which the information receiving apparatus stands by for a predetermined period until the content data is received;

a dispute resolution requesting substep where when the content data could not be received within the predetermined period, the information receiving apparatus transmits the dispute resolution content data and the provided information describing data to the dispute resolution apparatus and requests the dispute resolution apparatus to resolve a dispute;

a searching substep in which the dispute resolution apparatus that has been requested to resolve the dispute searches the cancellation list and the dispute resolution list;

an authenticity confirming substep where, when an exchanging of data between the information providing apparatus and the information receiving apparatus has not been cancelled and the dispute that has arisen between the information providing apparatus and the information receiving apparatus has not been resolved, the dispute resolution apparatus confirms whether the dispute resolution content data is authentic, based on the dispute resolution content data and the provided information describing data; and a forcible termination substep where when the dispute resolution content data is not authentic, the dispute resolution apparatus forcibly terminates the exchanging of data between the information providing apparatus and the information receiving apparatus.

2. The information providing method according to claim 1, wherein:

in the dispute resolution requesting substep, the information receiving apparatus also transmits the first receipt data to the dispute resolution apparatus, the content data receiving step includes a registering substep, where after confirming whether the dispute resolution content data is authentic and determining that the dispute resolution content data is authentic, the dispute resolution apparatus registers the first receipt data in the dispute resolution list, and the first receipt data receiving step includes:

a standby substep in which the information providing apparatus stands by for a predetermined period until the first receipt data is received;

a cancellation applying substep where when the first receipt data could not be received within the predetermined period, the information providing apparatus requests the dispute resolution apparatus to cancel an exchanging of data between the information providing apparatus and the information receiving apparatus;

a searching substep in which the dispute resolution apparatus that has been requested to cancel the exchanging searches the dispute resolution list;

a first receipt data transmitting substep where when a dispute that has arisen between the information providing apparatus and the information receiving apparatus has been resolved, the dispute resolution apparatus transmits first receipt data that is registered in the dispute resolution list to the information providing apparatus; and a first receipt data receiving substep in which the information providing apparatus receives the first receipt data from the dispute resolution apparatus.

3. The information providing method according to claim 1, wherein:

in the dispute resolution requesting substep, the information receiving apparatus also transmits the second receipt data to the dispute resolution apparatus, the content data receiving step further includes a registering substep, where after confirming whether the dispute resolution content data is authentic and determining that the dispute resolution content data is authentic, the dispute resolution apparatus registers the second receipt data in the dispute resolution list, and the second receipt data receiving step includes:

a standby substep in which the information providing apparatus stands by for a predetermined period until the second receipt data is received;

a dispute resolution requesting substep where when the second receipt data could not be received within the predetermined period, the information providing apparatus requests the dispute resolution apparatus to resolve a dispute;

a searching substep in which the dispute resolution apparatus that has been requested to resolve the dispute searches the cancellation list and the dispute resolution list;

a second receipt data transmitting substep in which when an exchanging of data between the information providing apparatus and the information receiving apparatus has not been cancelled and the dispute that has arisen between the information providing apparatus and the information receiving apparatus has been resolved, the dispute resolution apparatus transmits the second receipt data registered in the dispute resolution list to the information providing apparatus; and a second receipt data receiving substep in which the information providing apparatus receives the second receipt data from the dispute resolution apparatus.

4. An information providing system, comprising:

an information providing apparatus that provides content data and provided information describing data, which describes a content of the content data;

an information receiving apparatus that is connected to the information providing apparatus via a communication network, receives the content data and the provided information describing data, and transmits a receipt for the received content data to the information providing apparatus, wherein the information receiving apparatus confirms whether the content data is authentic based on the content data and the provided information describing data and transmits the receipt to the information providing apparatus only when the content data is confirmed to be authentic by the information receiving apparatus;

a confirmation information storage apparatus that is connected to the information receiving apparatus via the communication network and stores confirmation information, which is composed of (i) first converted information produced by converting the content data according to a predetermined method and (ii) the provided information describing data, wherein the receipt includes first receipt data and second receipt data and by collecting the first receipt data and the second receipt data, it is possible to prove that the information receiving apparatus has received the content data, a dispute resolution apparatus that is connected to each of the information providing apparatus, the information receiving apparatus and the confirmation information storage apparatus via the communication network and resolves disputes that arise between the information providing apparatus and the information receiving apparatus, the information providing apparatus includes:

a provided information describing data transmitting unit operable to transmit the provided information describing data to the information receiving apparatus and transmit dispute resolution content data, which only the dispute resolution apparatus is capable of decoding, together with the provided information describing data to the information receiving apparatus;

a content data transmitting unit operable to receive the first receipt data from the information receiving apparatus and to transmit the content data to the information receiving apparatus in response to reception of the first receipt data, and a second receipt data receiving unit operable to receive the second receipt data sent from the information receiving apparatus in response to the content data that has been transmitted, the information receiving apparatus includes:

a first receipt data issuing unit operable to receive the provided information describing data from the information providing apparatus, to issue the first receipt data in response to reception of the provided information describing data, and to transmit the first receipt data to the information providing apparatus, a first content confirming unit operable to receive the content data from the information providing apparatus and to confirm whether the content data is authentic using the provided information describing data received by the first receipt data issuing unit, a second receipt data issuing unit operable to issue the second receipt data only when the received content data is confirmed to be authentic by the first content confirming unit and to transmit the second receipt data to the information providing apparatus, and a receiving apparatus dispute requesting unit operable to transmit, when the content data cannot be received from the information providing apparatus within a predetermined period following transmission of the first receipt data, the dispute resolution content data and the provided information describing data to the dispute resolution apparatus and to request the dispute resolution apparatus to resolve a dispute, wherein the first content confirming unit is operable to receive the first converted information, which corresponds to the provided information describing data received from the information providing apparatus, from the confirmation information storage apparatus, to calculate second converted information by converting the content data received from the information providing apparatus according to the predetermined method, and to confirm whether the content data is authentic by comparing the first converted information and the second converted information; and the dispute resolution apparatus includes:

a dispute resolution list storing unit operable to store a dispute resolution list that stores information relating to whether a dispute that has arisen between the information providing apparatus and the information receiving apparatus has been resolved;

a cancellation list storing unit operable to store a cancellation list that stores information relating to whether an exchanging of data between the information providing apparatus and the information receiving apparatus has been cancelled;

a second content confirming unit operable to confirm, when an exchanging of data between the information providing apparatus and the information receiving apparatus has not been cancelled and the dispute that has arisen between the information providing apparatus and the information receiving apparatus has not been resolved, whether the dispute resolution content data is authentic, based on the dispute resolution content data and the provided information describing data received from the information receiving apparatus; and a forcible cancellation executing unit operable to forcibly terminate, when the dispute resolution content data is not authentic, the exchanging of data between the information providing apparatus and the information receiving apparatus.

5. The information providing system according to claim 4, wherein the second content confirming unit is operable to receive the first converted information, which corresponds to the provided information describing data received from the information providing apparatus, from the confirmation information storage apparatus, to calculate the second converted information by converting the content data received from the information providing apparatus according to the predetermined method, and to confirm whether the content data is authentic by comparing the first converted data and the second converted data.

6. A dispute resolution apparatus for use in a system that includes an information providing apparatus that provides content data, an information receiving apparatus that is connected to the information providing apparatus via a communication network, receives the content data, and transmits a receipt for the content data to the information providing apparatus, wherein the dispute resolution apparatus is to be connected to the information providing apparatus and the information receiving apparatus via the communication network and resolves a dispute that arises between the information providing apparatus and the information receiving apparatus, wherein the receipt includes first receipt data and second receipt data, and by collecting the first receipt data and the second receipt data, it is possible to prove that the information receiving apparatus has received the content data, the information providing apparatus includes a provided information describing data transmitting unit operable to transmit provided information describing data, which describes a content of the content data, and dispute resolution content data, which only the dispute resolution apparatus is capable of decoding, to the information receiving apparatus, a content data transmitting unit operable to receive the first receipt data from the information receiving apparatus and to transmit the content data to the information receiving apparatus in response to reception of the first receipt data; and a second receipt data receiving unit operable to receive the second receipt data sent from the information receiving apparatus in response to the content data that has been transmitted, the information receiving apparatus includes a first receipt data issuing unit operable to receive the provided information describing data and the dispute resolution content data from the information providing apparatus, to issue the first receipt data in response to reception of the data, and to transmit the first receipt data to the information providing apparatus, a second receipt data issuing unit operable to receive the content data from the information providing apparatus, to issue the second receipt data in response to reception of the content data, and to transmit the second receipt data to the information providing apparatus, and a receiving apparatus dispute requesting unit operable to transmit, when the content data cannot be received from the information providing apparatus within a predetermined period following transmission of the first receipt data, the provided information describing data and the dispute resolution content data to the dispute resolution apparatus and to request the dispute resolution apparatus to resolve a dispute, the dispute resolution apparatus comprising:

a dispute resolution list storing unit operable to store a dispute resolution list that stores information relating to whether a dispute that has arisen between the information providing apparatus and the information receiving apparatus has been resolved;

a cancellation list storing unit operable to store a cancellation list that stores information relating to whether an exchanging of data between the information providing apparatus and the information receiving apparatus has been cancelled;

a content confirming unit operable to confirm, when an exchanging of data between the information providing apparatus and the information receiving apparatus has not been cancelled and the dispute that has arisen between the information providing apparatus and the information receiving apparatus has not been resolved, whether the dispute resolution content data is authentic, based on the dispute resolution content data and the provided information describing data received from the information receiving apparatus; and a forcible cancellation executing unit operable to forcibly terminate, when the dispute resolution content data is not authentic, the exchanging of data between the information providing apparatus and the information receiving apparatus.

7. The dispute resolution apparatus according to claim 6, wherein the information providing system further includes a confirmation information storage apparatus that stores confirmation information, which is composed of (i) first converted information produced by converting the content data according to a predetermined method and (ii) the provided information describing data corresponding to the content data, and the dispute resolution apparatus is to be connected to the confirmation information storage apparatus via the communication network, wherein the content confirming unit is operable to receive the first converted information, which corresponds to the provided information describing data that has been received from the information providing apparatus, from the confirmation information storage apparatus, to calculate second converted information by converting the dispute resolution content data received from the information providing apparatus according to the predetermined method, and to confirm whether the dispute resolution content data is authentic by comparing the first converted data and the second converted data.

* * * * *